US007657188B2

(12) United States Patent
Covey

(10) Patent No.: US 7,657,188 B2
(45) Date of Patent: Feb. 2, 2010

(54) OPTICAL DEVICE AND CIRCUIT USING PHASE MODULATION AND RELATED METHODS

(75) Inventor: John Luther Covey, Braselton, GA (US)

(73) Assignee: CoveyTech LLC, Braselton, GA (US)

( * ) Notice: Subject to any disclaimer, the term of this patent is extended or adjusted under 35 U.S.C. 154(b) by 732 days.

(21) Appl. No.: 10/850,736

(22) Filed: May 21, 2004

(65) Prior Publication Data

US 2005/0259999 A1 Nov. 24, 2005

(51) Int. Cl.
*H04B 10/00* (2006.01)

(52) U.S. Cl. .................. 398/182; 398/183; 398/188; 398/201

(58) Field of Classification Search .......... 398/182–201
See application file for complete search history.

(56) References Cited

U.S. PATENT DOCUMENTS

| | | | |
|---|---|---|---|
| 4,070,094 A | 1/1978 | Martin | |
| 4,262,992 A | 4/1981 | Berthold, III | |
| 4,540,243 A | 9/1985 | Fergason et al. | |
| 4,715,680 A | 12/1987 | Kawaguchi et al. | |
| 5,091,980 A * | 2/1992 | Ogawa et al. | 385/3 |
| 5,093,802 A | 3/1992 | Hait | |
| 5,150,242 A | 9/1992 | Fellows | |
| 5,160,838 A | 11/1992 | Yang | |
| 5,239,173 A | 8/1993 | Yang | |
| 5,267,336 A | 11/1993 | Sriram et al. | |
| 5,466,925 A * | 11/1995 | Hait | 250/216 |
| 5,623,366 A * | 4/1997 | Hait | 359/577 |
| 5,644,123 A | 7/1997 | Hait | |
| 5,654,818 A | 8/1997 | Yao et al. | |
| 6,075,640 A * | 6/2000 | Nelson | 359/239 |
| 6,101,300 A * | 8/2000 | Fan et al. | 385/27 |
| 6,278,105 B1* | 8/2001 | Mattia | 250/214.1 |
| 6,298,180 B1* | 10/2001 | Ho | 385/15 |
| 6,473,541 B1* | 10/2002 | Ho | 385/15 |
| 6,483,614 B1 | 11/2002 | Romaniuk | |

(Continued)

FOREIGN PATENT DOCUMENTS

EP 1 296 177 A1 3/2003

(Continued)

OTHER PUBLICATIONS

Aschmoneit, E.—K., "Optical Switches And Transistors: Components For Purely Optical Signal Processing," Journal: Funkschau No. 26, Dec. 19, 1986, p. 46-48, West Germany, Language: German.

(Continued)

*Primary Examiner*—Agustin Bello
(74) *Attorney, Agent, or Firm*—Law Offices of Maximilian R. Peterson

(57) ABSTRACT

A disclosed apparatus comprises a guiding element and a nonlinear element. The guiding element guides optical input signals, at least one of which is phase-modulated, to an interference area where such signals meet and interfere. The resulting interference signal is nonlinearly discriminated by the nonlinear element to produce an optical output signal that can be amplitude- or phase-modulated according to the phase modulation of the input signals. The invention also includes related methods and photonic logic gates.

80 Claims, 10 Drawing Sheets

U.S. PATENT DOCUMENTS

| | | | |
|---|---|---|---|
| 6,487,331 B2 | 11/2002 | Hung | |
| 6,538,794 B1 * | 3/2003 | D'Aguanno et al. | 359/279 |
| 6,707,597 B2 * | 3/2004 | Hamada | 359/321 |
| 6,825,963 B2 * | 11/2004 | Kittaka et al. | 359/237 |
| 6,917,431 B2 * | 7/2005 | Soljacic et al. | 356/477 |
| 6,934,441 B2 * | 8/2005 | Toney | 385/24 |
| 6,937,781 B2 * | 8/2005 | Shirane et al. | 385/16 |
| 6,937,804 B2 | 8/2005 | McCoy et al. | |
| 6,940,637 B2 * | 9/2005 | Toney | 359/321 |
| 6,963,118 B2 * | 11/2005 | Deliwala et al. | 257/428 |
| 6,977,767 B2 * | 12/2005 | Sarychev et al. | 359/321 |
| 7,054,532 B2 * | 5/2006 | Forbes et al. | 385/122 |
| 7,085,029 B2 * | 8/2006 | Romaniuk | 359/108 |
| 7,164,823 B2 * | 1/2007 | Lee et al. | 385/43 |
| 7,447,404 B2 * | 11/2008 | Miller | 385/43 |
| 7,463,804 B2 * | 12/2008 | Covey | 385/122 |
| 2001/0012149 A1 * | 8/2001 | Lin et al. | 359/344 |
| 2002/0021445 A1 * | 2/2002 | Bozhevolnyi et al. | 356/445 |
| 2002/0048422 A1 * | 4/2002 | Cotteverte et al. | 385/4 |
| 2002/0146196 A1 * | 10/2002 | Shirane et al. | 385/16 |
| 2002/0195208 A1 | 12/2002 | Johnson et al. | |
| 2003/0007719 A1 | 1/2003 | Forrest et al. | |
| 2003/0011775 A1 * | 1/2003 | Soljacic et al. | 356/450 |
| 2003/0031438 A1 * | 2/2003 | Kambe et al. | 385/122 |
| 2003/0042487 A1 * | 3/2003 | Sarychev et al. | 257/53 |
| 2003/0072519 A1 * | 4/2003 | Bolanos | 385/16 |
| 2003/0179425 A1 * | 9/2003 | Romaniuk | 359/108 |
| 2004/0033009 A1 * | 2/2004 | Soljacic et al. | 385/16 |
| 2004/0046167 A1 | 3/2004 | McCoy et al. | |
| 2004/0156404 A1 * | 8/2004 | Kuchinsky et al. | 372/26 |
| 2005/0157974 A1 * | 7/2005 | Scherer | 385/16 |
| 2005/0163419 A1 * | 7/2005 | Scherer | 385/16 |
| 2006/0056758 A1 * | 3/2006 | Beausoleil et al. | 385/14 |
| 2006/0286488 A1 * | 12/2006 | Rogers et al. | 430/325 |

FOREIGN PATENT DOCUMENTS

| | | |
|---|---|---|
| WO | WO 02/093248 A1 | 11/2002 |
| WO | 2004099864 A2 | 11/2004 |

OTHER PUBLICATIONS

Hitoshi Nakamura, Shigeru Kohmoto, Niclas Carlsson, Yoshimasa Sugimoto, and Kiyoshi Askwa, "Large Enhancement Of Optical Nonlinearity Using Quantum Dots Embedded In A Photonic Crystal Structure For All-Optical Switch Applications," Conference Proceedings—Lasers and Electro-Optics Society Annual Meeting—LEOS v.2, 2000, p. 488-489, IEEE, Piscataway, New Jersey, US.

Edilson A. Camargo, Harold M.H. Chong and Richard M. De La Rue, "2D Photonic Crystal Thermo-Optic Switch Based On AlGaAs/GaAs Epitaxial Structure," Journal Optics Express, Feb. 23, 2004, V12, N4 (Feb. 23), p. 588-592, Optical Society of America, Washington, D.C.

Jose Sanchez-Dehesa, Felipe Ramos-Mendieta, Jorge Bravo-Abad, Javier Marti, Alejandro Martinez and Andres Garcia, "Suzuki Phase In Two-Dimensional Photonic Crystals," Proc. SPIE Apr. 2002, vol. 4655, p. 251-259, Photonic Bandgap Materials and Devices, Ali Adibi, Axel Scherer, Shawn-Yu Lin; Eds. (SPIE Homepage).

Eichmann, G., Li Y, Alfano RR, "Digital Optical Logic Using A Pulsed Sagnac Interfermeter Siwtch," Article, Optical Engineering, 1986, V 25, N1, p. 91-97, CUNY City College, Inst. Ultrafast Spectroscopy & Lasers/New York, NY; CUNY City College, Dept Elect Engn/New York, NY.

Optics.org, "Talking About a Revolution," Opto & Laser Interview, Mar. 2002, p. 1-3, http://optics.org/articles/ole/7/3/5/1, Europe.

Kivshar, Quiroga-Teixeiro, "Influence of Cross-Phase Modulation On Soliton Switching In Nonlinear Optical Fibers," Optics Letters, vol. 18, No. 12, Jun. 15, 1993, 3 pages, Dusseldorf 1, Germany, Goteborg, Sweden.

1 Abdulhalim, "Reflective Phase-Only Modulation Using One-Dimensional Photonic Crystals," J. Opt. A: Pure Appl. Opt. 2, (2000), Jan. 4, 2000, 3 pages, UK.

Li, Chan, Soukoulis, "Wave Propagation In Nonlinear Photonic Band Gap Materials," Jun. 15, 1996, Cover, pp. 1-10, Ames, Iowa.

Asakawa, "Fabrication and Characterization of Photonic Crystal Slab Waveguides and Application to Ultra-Fast All-Optical Switching Devices," Article ICTON 2003 Tu.B.5, vol. 1, 2003, pp. 193-197, Japan.

Soljacic, Ibanescu, Johnson, Fink, Joannopoulos, "Optimal Bistable Switching In Nonlinear Photonic Crystals," Physical Review E 66, 055601(R) (2002), Nov. 11, 2002, Cambridge, Massachusetts.

Invitation to Pay Additional Fees for International Search Report with Annex to Form PCT/ISA/206 Communication Relating to the Results of the Partial International Search from corresponding International Application No. PCT/US2004/043619 dated Jun. 20, 2006.

Kyoshi Asakawa, "Fabrication and Characterization of Photonic Crystal Slab Waveguides and Application to Ultra-Fast All-Optical Switching Devices," The Femtosecond Technology Research Association, Jun. 30, 2003, pp. 193-197, Tsukuba, Japan.

Asakawa K. Ed, Marciniak M., "Fabrication and Characterization of Photonic Crystal Slab Waveguides and Application to Ultra-Fast All-Optical Switching Devices," Transparent Optical Networks, 2003, Proceedings of 2003 5th International Conference on Warsaw, Poland, Jun. 29-Jul. 3, 2003, Piscataway, NJ, USA, IEEE, US, vol. 1, Jun. 29, 2003, pp. 193-197, XP010681430, ISBN: 0-7803-7816-4, cited in the application, the whole document.

International Search Report from corresponding International Application No. PCT/US2004/043619 dated Dec. 29, 2004.

Written Opinion of the International Searching Authority from corresponding International Application No. PCT/US2004/043619 dated Dec. 29, 2004.

* cited by examiner

OPTICAL DEVICE AND CIRCUIT USING PHASE MODULATION AND RELATED METHODS

BACKGROUND OF THE INVENTION

1. Field of the Invention

This invention relates to an optical device functioning as a photonic transistor. The invented optical device can be used as a basic element in an optical integrated circuit (OIC) that permits logic operations to be carried out using optical signals.

2. Description of the Related Art

In electronic devices, transistors are the basic elements of circuits. In digital applications, a transistor has the properties of a switch. The transistor can be driven between conductance and non-conductance states in order to change the voltage level, and thereby logic level, output by the transistor.

Interest has begun to emerge in recent years toward development of an optical device that behaves analogously to a electronic transistor. The reason for this interest is that optical signals can potentially travel faster in integrated circuits than electrical signals because they are not subject to capacitance which slows switching speed between logic states. Given the ever increasing demand for faster switching, it is expected that in the future, absent a major technological advance in electronics, use of optical devices will become increasingly desirable if not essential.

However, use of optical devices to form integrated logic circuits presents unique challenges. By its nature light propagates and cannot be stored. The ability to represent a logic state stably for as long as may be required thus becomes an issue. It would thus be desirable to provide a photonic transistor that can be used to represent logic states stably using optical signals. Moreover, there is an established industry using optical components which use primarily amplitude-modulated optical signals in which the amplitude or intensity of light pulses represents digital logic states. Any solution able to store and process data optically will also ideally be compatible with existing optical telecommunications infrastructure.

Also related to this application are light-guiding elements, which include materials such as photonic bandgap (PBG) elements. PBG elements are composed of structures with periodic spacing that enable light of a wavelength related to the spacing of the structures to travel in a confined manner through the material. Although guiding elements are interesting from the standpoint that they automatically filter light of undesired wavelengths, an undesired result is that light is quickly attenuated in guiding elements. It is therefore desirable that optical logic and signal processing be performed with a relatively short transmission pathway through a guiding element such as a PBG material to avoid its being unduly attenuated.

In the manufacture of virtually any integrated circuit, it is desirable that the components of the circuit be integrated on the substrate in a relatively small area to enable the most functionality possible per unit area of the device. Although conductive electrical wires and the like can turn abruptly in connecting to electrical transistors, optical waveguides can not generally turn so abruptly without use of mirrors because excessive light will escape the waveguide. Thus, integrated optical waveguides have limits on how abruptly they can turn which further impacts on the size of the integrated device and creates issues regarding optical isolation of the integrated devices. It would be desirable to provide an integrated device in which optical signals can propagate in abrupt turns to increase functionality of integrated optical devices.

Moreover, as more optical devices and related connections are integrated on a substrate, it becomes desirable to optically isolate the devices to avoid multi-path effects and cross-talk between devices. It would thus be desirable to provide an optical circuit in which the optical devices are effectively optically isolated from one another.

In some optical modulation schemes, data is represented by more than two amplitude levels. The problem with such an approach is that it requires very stringent control on the amplitudes of the optical signals on which logic operations are performed. For example, in an AND gate, if two pulses are both at high or "1" logic levels represented by an amplitude of "1" in this example, then the output will have an amplitude that is the linear sum of these two levels, or "2". This output signal must be attenuated back to "1" before it can be provided to the next optical gate in the circuit. This approach for an optical modulation scheme is not generally desirable because of the complications associated with maintaining appropriate amplitude levels throughout the circuit. It would therefore be desirable to provide an optical circuit that does not require management of the amplitudes as required in such linearly additive optical circuits.

The publication "Fabrication and Characterization of Photonic Crystal Slab Waveguides and Application to Ultra-Fast All-Optical Switching Devices," Kiyoshi Asakawa, The Femto Technology Research Association, Jun. 30, 2003, discloses a symmetrical Mach-Zender interferometer formed in a photonic crystal. The input side of the device includes three input paths for light pulses to enter. The outer paths receive a control pulse, and because one of the two outer paths is different in length from the other, the control pulse received by both of these outer paths is delayed in one path by $\pi$ radians relative to the other path. An optical signal pulse is input to the central path, which branches into two separate paths that meet with respective outer input paths. At the two places where the outer and inner symmetric paths meet, the crystal slab has two quantum dot nonlinear elements, one for each of the two meeting places. The quantum dot nonlinear elements outputs are provided to initially separate pathways that join together to form a single output path for the output light pulse. The Asakawa device represents binary zeros with the lack of light, which cannot be used to perform digital logic, because the device transmits no data if no light enters it. The Asakawa device was thus created with the intention of using it as a switch or filter for incoming fiber optic data. It would be desirable to provide a photonic transistor that can be used as the basis for gates to perform optical digital logic for generic all-purpose optical computing.

Also worth mentioning in relation to this disclosure is US 2003/0179425 filed Jan. 27, 2003 and published Sep. 23, 2003, naming Charles Romaniuk as sole inventor. The application discloses a device with a combiner stage followed by a filter stage, next followed by an output stage. The combiner stage includes two y-shaped combiners, the first of which receives two phase-modulated input signals to generate an output signal that is supplied to one of two inputs to the second combiner. The second input to the second y-shaped combiner is a control input. The filter stage includes an absorption diode which receives the output of the second combiner of the combiner stage, and generates a binary output based on same. The output of the y-combiner of the output stage receives as one input the output of the absorption diode of the filter stage as its input. The combiner of the output stage also receives a second input which is another control signal. Depending upon the state of the two control inputs, which are π radians out of phase from one another, the logic circuit functions as either an AND or OR logic gate.

Although Romaniuk's device is meritorious in several respects, it requires use of both phase and amplitude modulated inputs to perform complex logic operations, and thus requires a linear absorber to discern logic levels. More specifically, in the Romaniuk device, if two signals interfere constructively, the magnitude of the output becomes twice as large. If this interference continues to propagate through a circuit as it does in the Romaniuk device, complications result when it is used as an input to a subsequent logic gate with an amplitude twice as large as it was originally. By absorbing half of the signal, the Romaniuk device can lessen the interference back to 1× amplitude. However, this requires exacting control of the amplitude of the logic levels in the device through the use of a linear optical absorber.

For many applications, it would be desirable to utilize a different approach in which complimentary networks with sets of photonic transistors which are activated or deactivated, depending upon the states of the input signals. This approach can be used to avoid representation of more than two digital logic states with different amplitudes that linearly add, which is highly subject to error without extensive control of amplitude levels throughout the circuit.

Thus, although the published patent application U.S. 2003/0179425 has its merits, it would be desirable if a device could be obtained that is relatively simplified, capable of integration on a substrate, does not require use of linearly additive signals propagating through its circuit requiring complexity to discern and interpret logic levels, and yet one that provides effective logic operations on optical signals.

SUMMARY OF THE INVENTION

The disclosed invention, in its various embodiments, overcomes one or more of the above-mentioned problems, and achieve additional advantages as hereinafter set forth.

A method according to an embodiment of the invention comprises the steps of combining a phase-modulated first optical signal with a second optical signal to generate an optical interference signal that is amplitude-modulated based on the phase modulation of at least the first optical signal, and nonlinearly discriminating the optical interference signal to produce an optical output signal having a digital logic state representing data. The optical interference signal can be amplitude-modulated based on the phase modulation of one or both of the first and second optical signals. Furthermore, the optical interference signal can be phase-modulated based on the phase modulation one or both of first and second optical signals. The second optical signal can be an optical reference signal providing a phase reference for comparison with the first signal. The combining can be performed in an interference area defined in a guiding element which has pathways that receive and guide the first and second optical signals to the interference area where the first and second optical signals meet and interfere with one another. The guiding element can define a pathway that guides the optical interference signal to a nonlinear element that nonlinearly discriminates the optical interference signal to produce the optical output signal. The guiding element can comprise a photonic bandgap (PBG) element having periodically spaced structures. The method can comprise the step of generating the first optical signal with a light source which can be a laser. The method can further comprise focusing the first optical signal at an input to the optical device, and such focusing can be performed by a lens. The method can comprise the step of receiving the phase-modulated first optical signal, which can be performed with a PBG element of an optical device. The method can also comprise modulating the phase of the first optical signal, which can be done by a piezoelectric element that changes the effective path length experienced by the first optical signal based on the first modulation signal in order to modulate its phase. The method can comprise guiding the phase-modulated first optical signal, which can be done with a PBG element of an optical device. The method can further comprise filtering the phase-modulated first optical signal, and this step can be performed according to the spacing of structures in a photonic bandgap (PBG) element of an optical device. The method can comprise the step of generating the second optical signal with a light source, which light source can be a laser. The method can further comprise the step of focusing the second optical signal at an input to the optical device, which can be done with a lens. The method can further comprise the step of receiving the second optical signal, which can be performed by a PBG element of an optical device. The method can further comprise the step of modulating the phase of the second optical signal, a step which can be performed by a piezoelectric element that changes the effective path length experienced by the second optical signal based on the first modulation signal in order to modulate its phase. The method can further comprise the step of guiding the second optical signal, which can be performed by a photonic bandgap (PBG) element of an optical device. The method can further comprise the step of filtering the second optical signal, which can be done according to the spacing of structures in a photonic bandgap (PBG) element of an optical device. The method can further comprise the step of outputting the optical output signal.

An optical device according to an embodiment of the invention receives a phase-modulated first optical signal and a second optical signal. The optical device comprises an integrated photonic transistor which has a guiding element and a nonlinear element. The guiding element is formed of periodic structures having a spacing related to the wavelength of the phase-modulated first optical signal and the second optical signal propagating therein. The guiding element further defines first and second pathways along which travel the phase-modulated first optical signal and the second optical signal, respectively. The first and second pathways join to form an interference area in which the first and second optical signals interfere to form an optical interference signal. The nonlinear element receives the optical interference signal and nonlinearly discriminates the optical interference signal to form the optical output signal having a digital or binary logic state. The integrated photonic transistor can be formed on a substrate. The guiding element can be composed of periodic structures defined in a substrate by processing thereof. The processing can comprise selective etching of the substrate. Alternatively, or in addition to etching, the processing can comprise selective deposition of material on the substrate. The substrate can be composed of silicon, for example. The periodic structures are spaced by the wavelength of the first and second optical signals divided by the index of refraction of the material defining the structures. The adjacent periodic structures can be spaced by 0.44±0.04 microns. The periodic structures can be cylindrical, spherical, rod-like or otherwise shaped. The first and second pathways and the interference area are formed by the absence of periodic structures along the first and second pathways and interference area. The guiding element can define an output pathway along which the optical interference signal travels. The nonlinear element can comprise a grating, multiple quantum dot array, cavity, non-resonant amplifier, laser, or combinations thereof, for example. The laser can generate the optical output signal at a wavelength of 1.55±0.02 microns. The effective length of the nonlinear element and the output pathway can at least in part define the phase of the optical output signal at an output of the optical device. The optical device can further comprise a power supply coupled to provide electric power to the non-linear element. The power supply can be integrated on a substrate together with the nonlinear element and the guiding element. The optical device can comprise a phase modulator situated in the first pathway to receive the first optical input signal and coupled to receive a modulation signal. The phase modulator can be capable of changing the phase of the first optical input signal to generate the phase-modulated first optical input signal which travels from the phase modulator along the first pathway to the interference area to meet and interfere with the second optical signal to form the optical interference signal. The guiding element, nonlinear element and the phase modulator can be integrated together on a substrate. The modulation signal can be electric and the phase-modulator comprises a piezoelectric element capable of changing the effective path length traveled by the first optical signal to phase-modulate the first optical signal. Alternatively, the modulation signal can be optic and the phase-modulator comprises an optical phase modulation element capable of changing its refractive index in response to an optical modulation signal to phase-modulate the first optical signal. The optical device can comprise an additional phase modulator situated in the second pathway to receive the second optical input signal and coupled to receive a modulation signal. The additional phase modulator is capable of changing the phase of the second optical input signal to generate phase-modulated second optical input signal which travels from the phase modulator along the first pathway to the interference area to meet and interfere with the first optical signal to form the optical interference signal. The additional phase modulator can be integrated together with the guiding element and nonlinear element on a substrate. The modulation signal can be electric and the additional phase-modulator can comprise a piezoelectric element capable of changing the effective path length traveled by the second optical signal to phase-modulate the second optical signal. Alternatively, the modulation signal can be optic and the phase-modulator can comprise an optical phase modulation element capable of changing its refractive index in response to an optical modulation signal to phase-modulate the first optical signal. The optical device can comprise a filter formed of spaced structures positioned in the first pathway. The filter can be integrated on a substrate along with the guiding element. The filter can be formed of spaced structures positioned in the second pathway. The filter can be integrated on a substrate along with the guiding element. The optical device can comprise a light source generating the first optical signal, and positioned to provide the first optical signal to the first pathway of the guiding element of the optical device. The light source can be integrated on a substrate along with the guiding element. The light source can be coherent, and can be generated by a solid-state laser. For example, the first optical signal generated by the light source can have a wavelength of 1.55±0.02 microns. The optical device can comprise one or more optical focusing element(s) such as convex lenses positioned to focus the first optical signal to an opening of the first pathway, the second optical signal to an opening of the second pathway, and/or the optical output signal to an opening of an output element receiving the optical output signal. The optical focusing element(s) can be integrated on a substrate along with the guiding element. The optical focusing element(s) can comprise a convex optical lens. The optical interference signal can be amplitude-modulated based on the phase modulation of at least the first optical signal. Alternatively, or in addition to modulation based on the first optical input signal, the optical interference signal can be amplitude-modulated based on the phase modulation of the second optical signal. As yet another alternative, the optical interference signal can be phase-modulated based on the phase modulation of at least the first optical signal. Furthermore, the optical interference signal can be phase-modulated based on the phase modulation of the second optical signal. The second optical signal can be an optical reference signal providing a phase reference relative to which the phase of the first optical signal can be determined. The guiding element can comprise a photonic bandgap (PBG) element.

An optical circuit in accordance with an embodiment of the invention comprises a logic stage and an output stage. The logic stage comprises at least one optical logic gate integrated on a substrate. The optical logic gate receives at least one phase-modulated optical input signal. The optical logic gate generates a phase-modulated optical output signal based on the phase-modulated optical input signal. The output stage comprises a phase-to-amplitude converter coupled to receive the phase-modulated optical input signal, which generates an amplitude-modulated optical output signal based on the phase-modulated optical input signal. The logic stage can comprise one or more inverters and one or more NAND gates. Because any Boolean logic operation can be performed with one or more inverters and NAND gates, the optical circuit can be used to implement any Boolean logic operation on optical input signals to create an optical output signal. The logic stage can comprise one or more phase-shift elements to perform phase inversion to invert the digital logic state of a signal(s) within the logic stage. The optical logic gate can comprise at least one photonic transistor. The photonic transistor can comprise an optical interference area and a non-linear element. The photonic transistor can receive the phase-modulated optical input signal and an optical reference signal which meet and interfere in the optical interference area to produce an optical interference signal that is nonlinearly discriminated by the photonic transistor to generate the phase-modulated optical output signal. The optical logic gate can be further coupled to receive an optical reference signal. The optical logic gate can generate the phase-modulated optical output signal based on the optical reference signal in addition to the phase-modulated optical input signal. The logic stage can comprise a guiding element in part defining a plurality of optical logic gates that optically isolate the optical logic gates from one another. The guiding element can comprise a photonic bandgap (PBG) element. The guiding element can comprise optical pathways connecting the optical logic gates, at least one of which turns at an angle of at least $\pi/3$ radians, which is generally much greater than possible with previous integrated optical devices. The logic stage and output stage can be integrated on a substrate.

A method according to another embodiment of the invention comprises the steps of receiving at least one phase-modulated optical input signal, receiving an optical reference signal, performing a phase logic operation based on the phase-modulated optical input signal and the optical reference signal to produce a phase-modulated optical output signal, and outputting the phase-modulated optical output signal. These steps can be performed by a logic stage comprising at least one optical logic gate. The optical logic gate can comprise one or both of a NAND gate and an inverter gate. The method according to the invention can further comprise the steps of receiving the phase-modulated optical output signal, converting the phase-modulated optical output signal into an amplitude-modulated optical output signal, and outputting the amplitude-modulated optical output signal. These steps can be performed by an output stage of the optical circuit. The output stage can comprise a phase-to-amplitude converter.

A method according to another embodiment of the invention comprises the steps of receiving the phase-modulated optical output signal, converting the phase-modulated optical output signal into an amplitude-modulated optical output signal, and outputting the amplitude-modulated optical output signal. These steps can be performed by an output stage of an optical circuit. The output stage can comprise a phase-to-amplitude converter.

An optical inverter gate according to one embodiment of the invention comprises optical inverter gate comprising a guiding element, a first nonlinear element, and a second nonlinear element. The guiding element defines an input pathway having first and second sections, and a reference pathway having first and second sections which meet with the first and second sections, respectively, of the input pathway at corresponding first and second interference areas. The first and second intermediate pathways run from the first and second interference areas, respectively, to meet at a junction area joined with an output pathway defined by the guiding element. The first nonlinear element is positioned in the first intermediate pathway, and the second nonlinear element is positioned in the second intermediate pathway. The input pathway can receive a first optical signal having a wavelength related to spacing of structures of the guiding element. The optical inverter gate can comprise a light source generating a reference optical signal having the same wavelength as the first optical input signal, positioned to provide the reference optical signal to the first and second interference areas via respective reference pathways to produce first and second interference signals. One or more of the first and second interference signals can be nonlinearly discriminated by a respective one of the first and second nonlinear elements to generate an optical output signal provided to the output pathway as the optical output signal having a phase that is inverted relative to phase modulation of the optical input signal. The effective path length of the second section of the reference pathway can differ from the effective path length of the first section of the reference pathway by ($\lambda$/RI)/2, or an odd positive integer multiple thereof, in which $\lambda$ is the wavelength of the optical reference signal and RI is the refractive index of the structures defining the guiding element. The effective path length of the second section of the reference pathway can differ from the effective path length of the first section of the reference pathway by length L3=($\lambda$/RI)/2 in which $\lambda$ is the wavelength of the optical reference signal and RI is the refractive index of the structures defining the guiding element. The first and second intermediate pathways can differ from a positive integer multiple of a wavelength of the optical reference signal propagating in the guiding element by respective lengths L1 and L2 of ($\lambda$/RI)/2 in which $\lambda$ is the wavelength of the optical reference signal and RI is the refractive index of the structures defining the guiding element, the lengths L1 and L2 inverting the phases of the first and second optical interference signals, respectively, by $\pi$ radians relative to the phases of the optical input and reference signals at inputs to the input and reference pathways, respectively. The guiding element can be a photonic bandgap (PBG) element, one or more optical waveguides, a photo-sensitive substance (i.e., a substance that converts into a micro-guide when exposed with curing light), or combinations thereof. The guiding element can be in part defined by a plurality of optical logic gates that optically isolate the input, reference, and output pathways and interference areas from one another. The guiding element can define at least one pathway turning at an angle of at least $\pi$/3 radians, and thus more abruptly than possible in many previous integrated devices. One or both of the first and second nonlinear elements comprises a grating, multiple quantum dot array, laser, cavity, non-resonant amplifier, or combinations thereof.

An optical NAND gate in accordance with an embodiment of the invention comprises a guiding element defining first, second, third and fourth input pathways, and a reference pathway having first and second section. The first section of the reference pathway meets the first input pathway at a first interference area. The first interference area is joined by a first intermediate pathway to the second input pathway at a second interference area. The second interference area is joined to a second intermediate pathway. The second section of the reference pathway meets with third and fourth intermediate pathways joining with respective third and fourth input pathways to define third and fourth interference areas. The third and fourth interference areas join third and fourth intermediate pathways. The second, third, and fourth intermediate pathways meet with an output pathway forming the output of the optical NAND gate. The guiding element can comprise a photonic bandgap (PBG) element, one or more optical waveguides, a photo-sensitive substance, or combinations thereof. The NAND gate further comprises a first nonlinear element positioned in the first intermediate pathway, a second nonlinear element positioned in the second intermediate pathway, a third nonlinear element positioned in the third intermediate pathway, and a fourth nonlinear element positioned in the fourth intermediate pathway. One or more of the first, second, third and fourth nonlinear elements comprises a grating, multiple quantum dot array, laser, cavity, non-resonant amplifier, or combinations thereof. The guiding element can optically isolate non-conjoined pathways and interference areas from one another. The guiding element can define at least one pathway at an angle of at least $\pi$/3 radians, which can be used to reduce the space occupied on a substrate by the NAND gate. The first and third input pathways can receive a first optical input signal, and the second and fourth input pathways can receive a second optical input signal. The wavelength of the first and second optical input signals has a wavelength related to spacing of structures of the guiding element. The optical device can comprise a light source generating a reference optical signal having the same wavelength as the first optical input signal, positioned to provide the reference optical signal to the reference pathway. The third and fourth intermediate pathways differ from lengths that are positive integer multiples of the wavelength $\lambda$ of the optical reference signal by including respective lengths L1 and L2 of ($\lambda$/RI)/2 in which $\lambda$ is the wavelength of the optical reference signal and RI is the refractive index of periodically-spaced structures defining the guiding element. The lengths L1 and L2 invert the phase of the optical reference signal received at the input of the third and fourth intermediate pathways via the reference pathway, by shifting the optical reference signal by $\pi$ radians relative to the phase of the optical reference signal at the input to the third and fourth pathways. The guiding element can comprise periodically-spaced structures. The guiding element can optically isolate non-conjoined pathways and interference areas defined in the guiding element.

An optical inverter gate in accordance with an embodiment of the invention comprises first and second photonic transistors receiving first and second optical input signals. The optical inverter gate can be configured to shift the phase of the second optical input signal so that the second optical input signal received by the first photonic transistor is out of phase by $\pi$ radians relative to the phase of the second optical input signal received by the second photonic transistor due to the presence of a phase shift element in the optical gate. The output signals generated by the first and second photonic transistors are further shifted by π radians due to the presence of respective phase shift elements in the optical gate and traveling via respective pathways to an output pathway where one of the optical signals is output from the optical inverter gate depending upon the logical state of the first and second optical input signals. The optical gate comprises a photonic bandgap (PBG) element having periodically-spaced structures that define pathways for guiding the first and second optical input signals, that define the interference area, and an output pathway to guide the optical output signal to the output of the optical gate. At least one of the pathways turns at an angle of at least π/3 radians. The periodically-spaced structures can be used to optically isolate the first and second photonic transistors. The periodically-spaced structures can filter the first and second optical signals to exclude wavelengths other than the wavelength of the first and second optical signals.

An optical NAND gate in accordance with an embodiment of the invention comprises first, second, third, and fourth photonic transistors. The first photonic transistor receives a first optical input signal and an optical reference signal and generates a first optical output signal based thereon. The second optical transistor receives the first optical output signal and the second optical input signal, and generates a second optical output signal based thereon. A first phase shift element shifts the phase of the optical reference signal by π radians relative to the phase of the optical reference signal input to the first transistor. The third transistor generates a third optical output signal based on the phase-shifted optical reference signal and the first optical input signal. A second phase shift element shifts the phase of the optical reference signal by π radians relative to the phase of the optical reference signal input to the first transistor. The fourth transistor generates a fourth optical output signal based on the second optical input signal and the phase-shifted optical reference signal. One of the second, third, and fourth optical output signals is provided to the output pathway as the output of the NAND gate. The first, second, third, and fourth photonic transistors can be defined in a guiding element having spaced structures arranged according to the wavelength of the first and second optical input signals and the optical reference signal propagating in the NAND gate. The spaced structures of the guiding element can optically isolate the first, second, third, and fourth optical transistors from one another. The guiding element can define at least one pathway guiding one of the signals propagating in the optical NAND gate which turns at an angle of at least π/3 radians. The periodic spacing of the guiding element can filter at least one wavelength other than the wavelength of the first and second optical input signals and the optical reference signal.

An optical device in accordance with the invention receives a phase-modulated first optical input signal and a second optical input signal. The optical device comprises at least one first photonic transistor coupled to receive the first and second optical input signals, and at least one second photonic transistor coupled to receive the first and second optical input signals. The optical device is configured so that the first transistor is activated and the second photonic transistor is deactivated by one of the first and second optical input signals in a first logical state, and the first transistor is deactivated and the second photonic transistor is activated if the one of the first and second optical input signals is in a second logical state. One of the first and second photonic transistors outputs an optical input signal having a phase-modulated logic state based on the first and second optical signals that is determined by which one of the first and second photonic transistors is activated. The first and second photonic transistors can define respective interference areas receiving the first and second signals, and respective nonlinear elements receiving and non-linearly discriminating the resulting optical interference signals to produce an optical output signal or no light depending upon whether the transistor is activated. The first and second photonic transistors can be integrated on a substrate.

An optical device in accordance with another embodiment of the invention comprises at least one first photonic transistor coupled to receive a phase-modulated first optical signal and a second optical signal, and at least one second photonic transistor coupled to receive the phase-modulated first optical signal and the second optical signal. The outputs of the first and second photonic transistors join together to form an output of the optical device. The optical device further comprises a phase-shift element delaying one of the first and second optical input signals before providing the same to the one of the first and second photonic transistors. The one of the first and second photonic transistors is activated by the presence of the phase-shift element if the one of the first and second optical input signals is in a first logical state, and the other of the first and second photonic transistors is deactivated if the one of the first and second optical input signals is in the first logical state. The one of the first and second photonic transistors is deactivated by the presence of the phase-shift element if the one of the first and second optical input signals is in the second logical state, and the other of the first and second photonic transistors is activated if the one of the first and second optical input signal is in the second logical state. The optical output signal generated at the output of the first and second photonic transistors depends at least upon the logical state of the one of the first and second optical input signals input to the one of the first and second photonic transistors that is activated by the state of the one of the first and second optical input signals. The first and second photonic transistors can comprise respective interference areas receiving first and second optical input signals to produce optical interference signals, and respective nonlinear elements to non-linearly discriminate respective optical interference signals to produce corresponding phase-modulated optical output signals if activated, and no light if deactivated. The first and second photonic transistors and the phase-shift element can be integrated on a substrate.

BRIEF DESCRIPTION OF THE DRAWINGS

Figure 1:
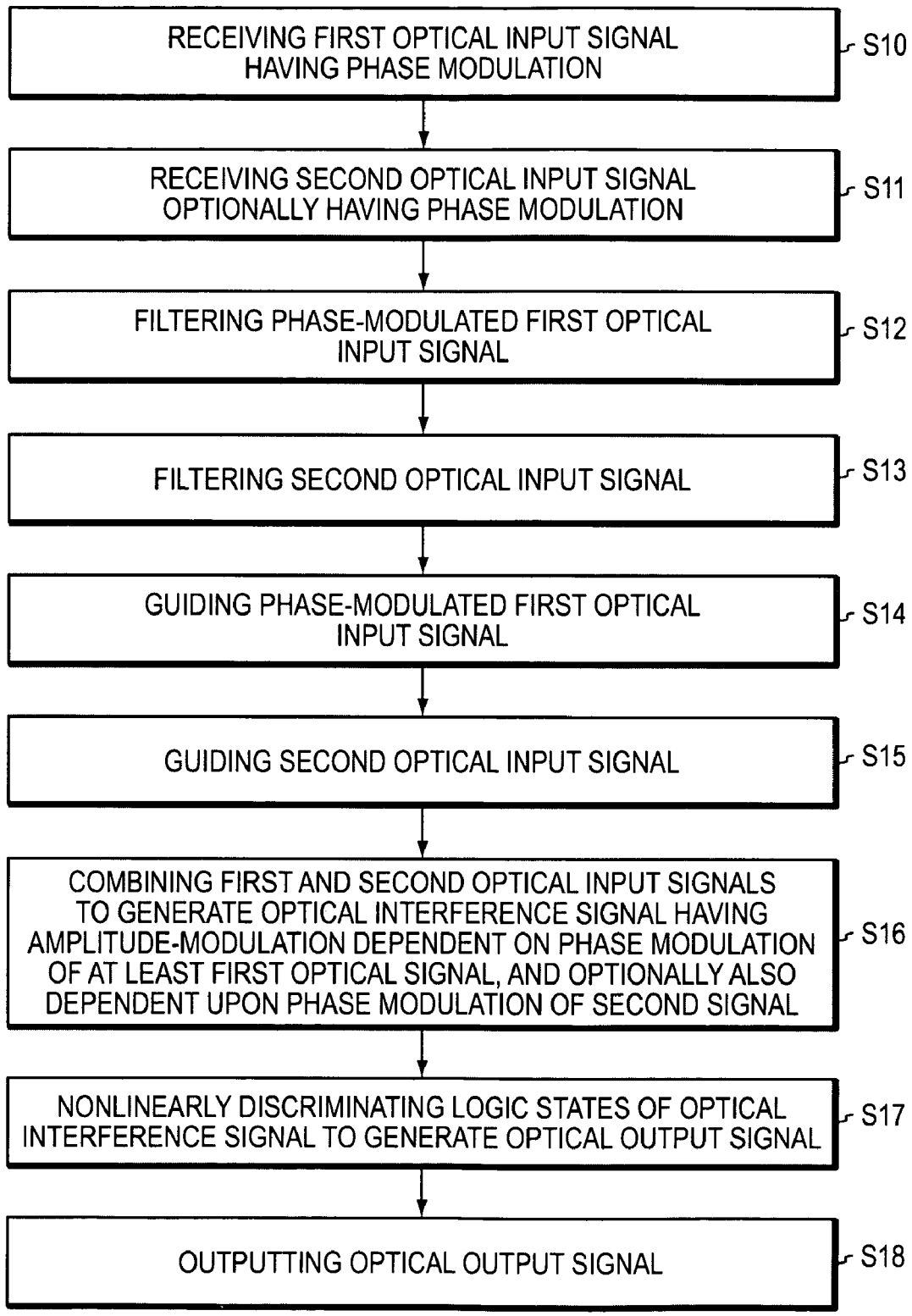

Having thus described the invention in general terms, reference will now be made to the accompanying drawings, which are not necessarily drawn to scale, and wherein:

FIG. 1 is a general method of the invention for generating an amplitude-modulated optical output signal based on one or more phase-modulated optical input signals.

Figure 2:
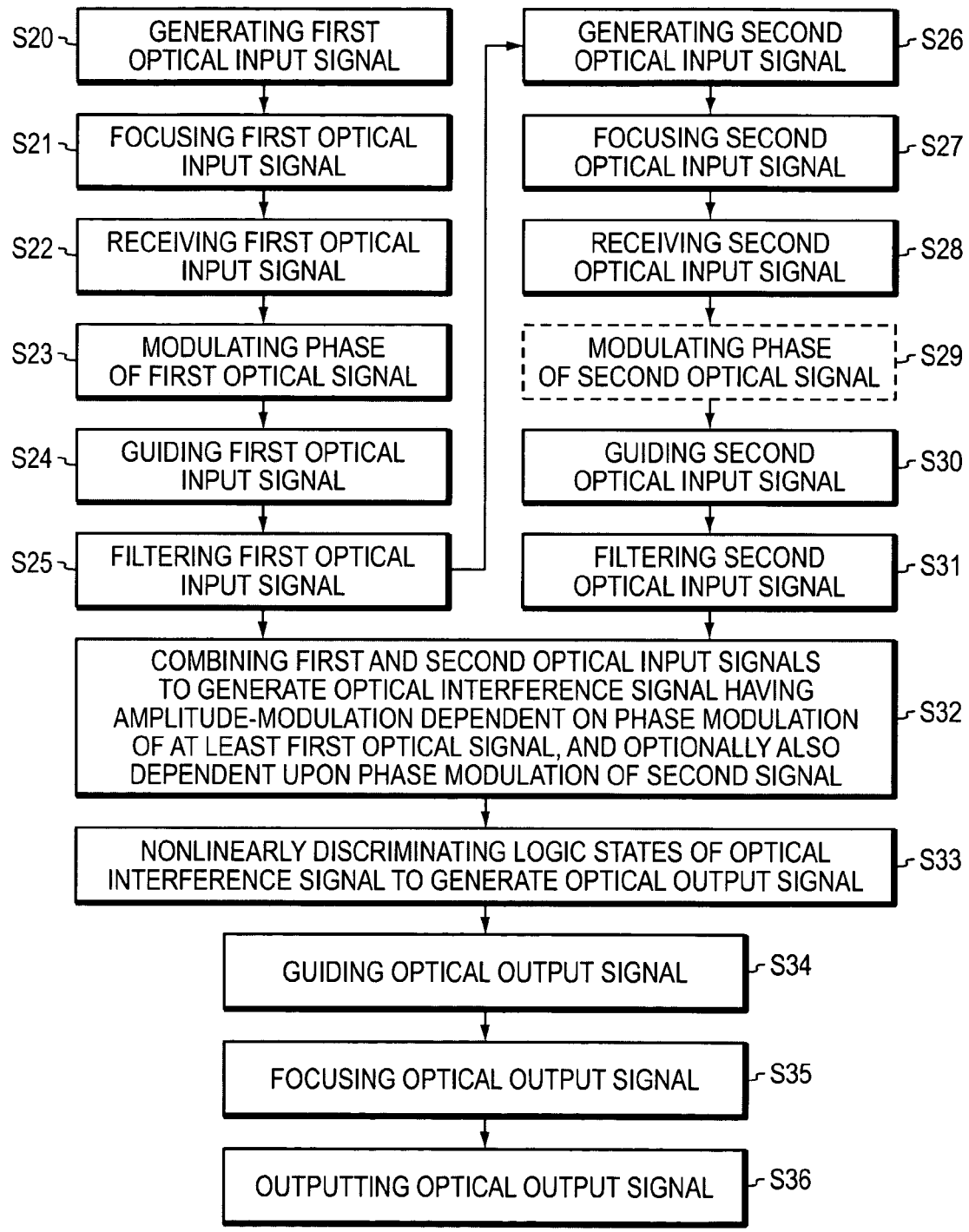

FIG. 2 is a relatively specific method of the invention for generating an amplitude-modulated optical output signal based on one or more phase-modulated optical input signals.

Figure 3:
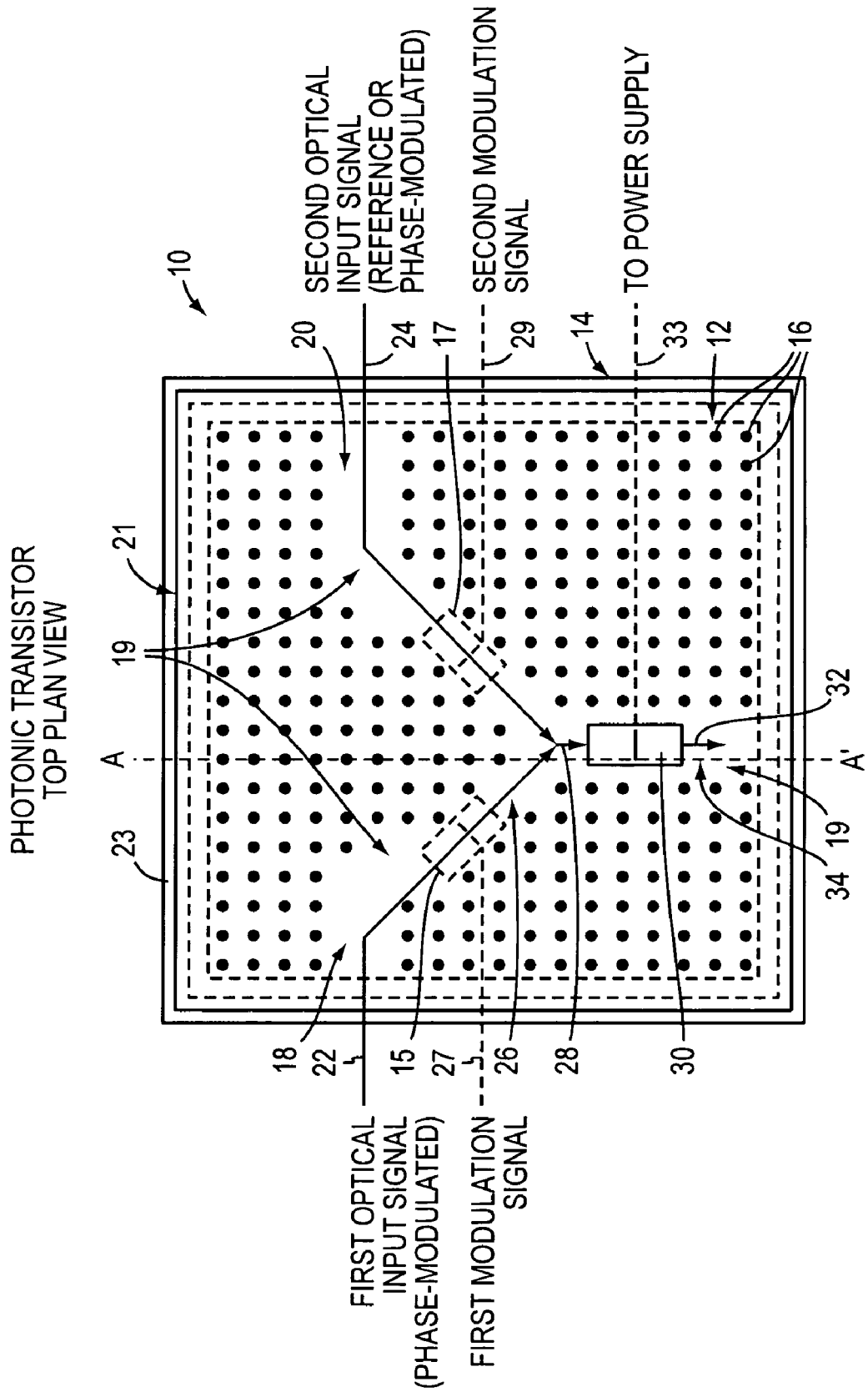

FIG. 3 is a plan view of a photonic transistor in accordance with the present invention, which incorporates in this exemplary embodiment an interference area defined in a photonic bandgap (PBE) element and a nonlinear element.

Figure 4:
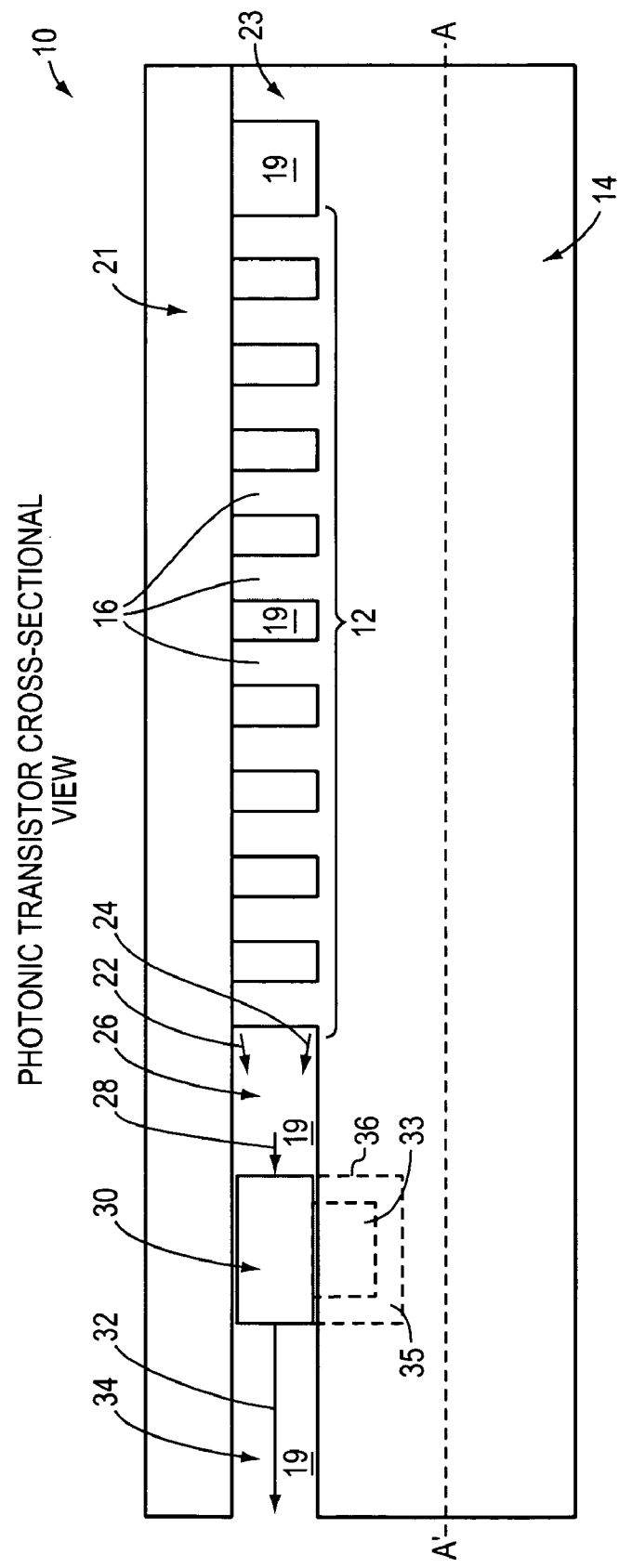

FIG. 4 is a cross-sectional side elevation view of the photonic transistor of FIG. 3 taken along plane A-A' of FIG. 3.

Figure 5:
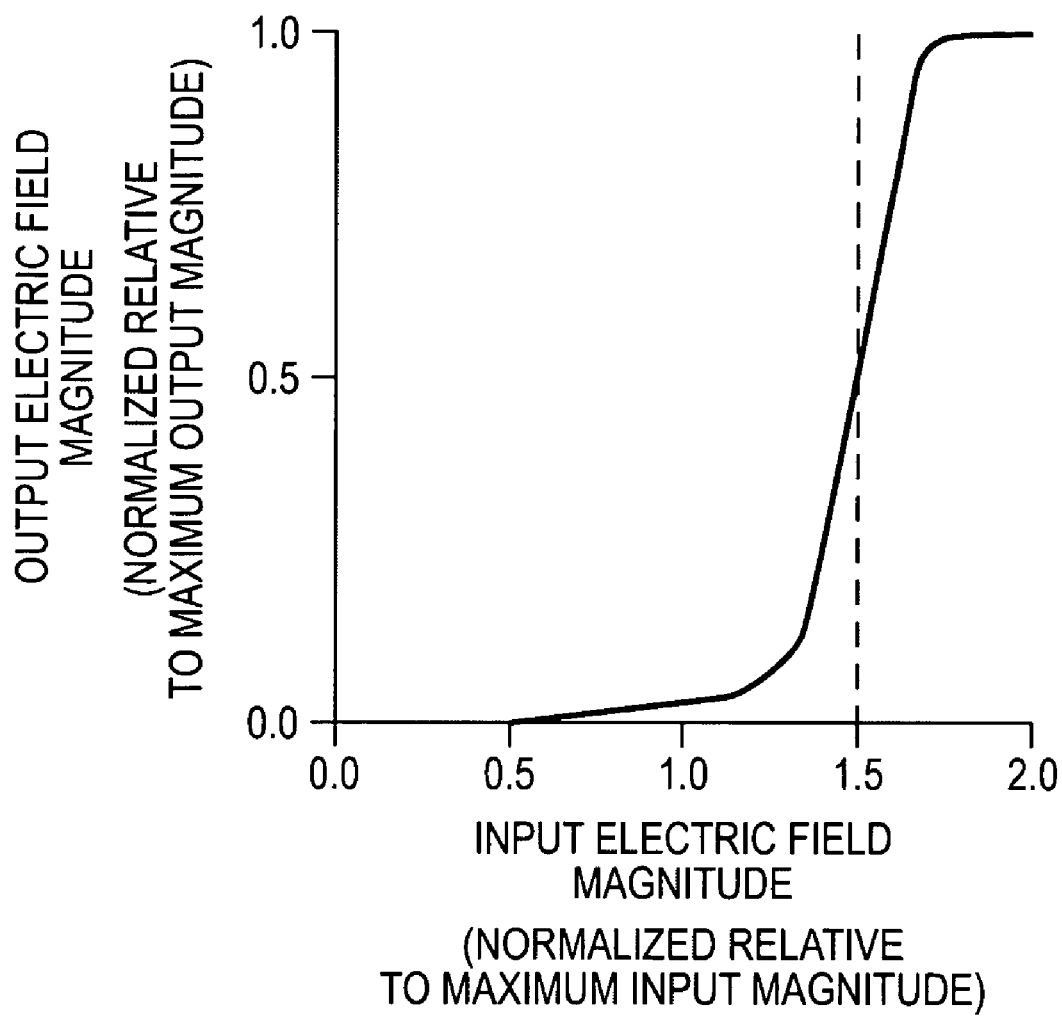

FIG. 5 is a graph of input electric field magnitude versus output electric field magnitude for a first implementation of a nonlinear element in accordance with the present invention.

Figure 6:
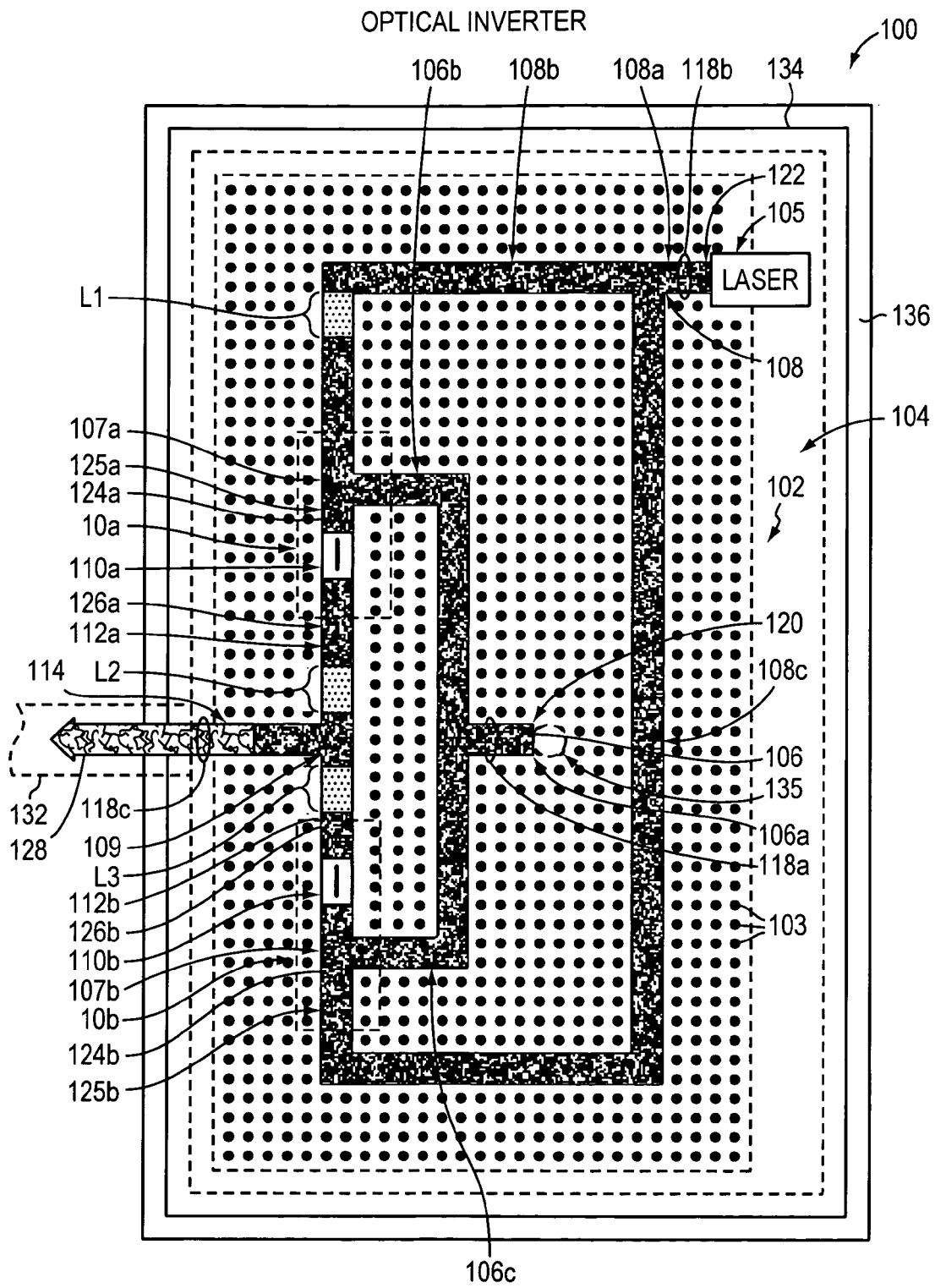

FIG. 6 is a plan view of a optical inverter gate in accordance with the invention, incorporating photonic transistors therein.

Figure 7:
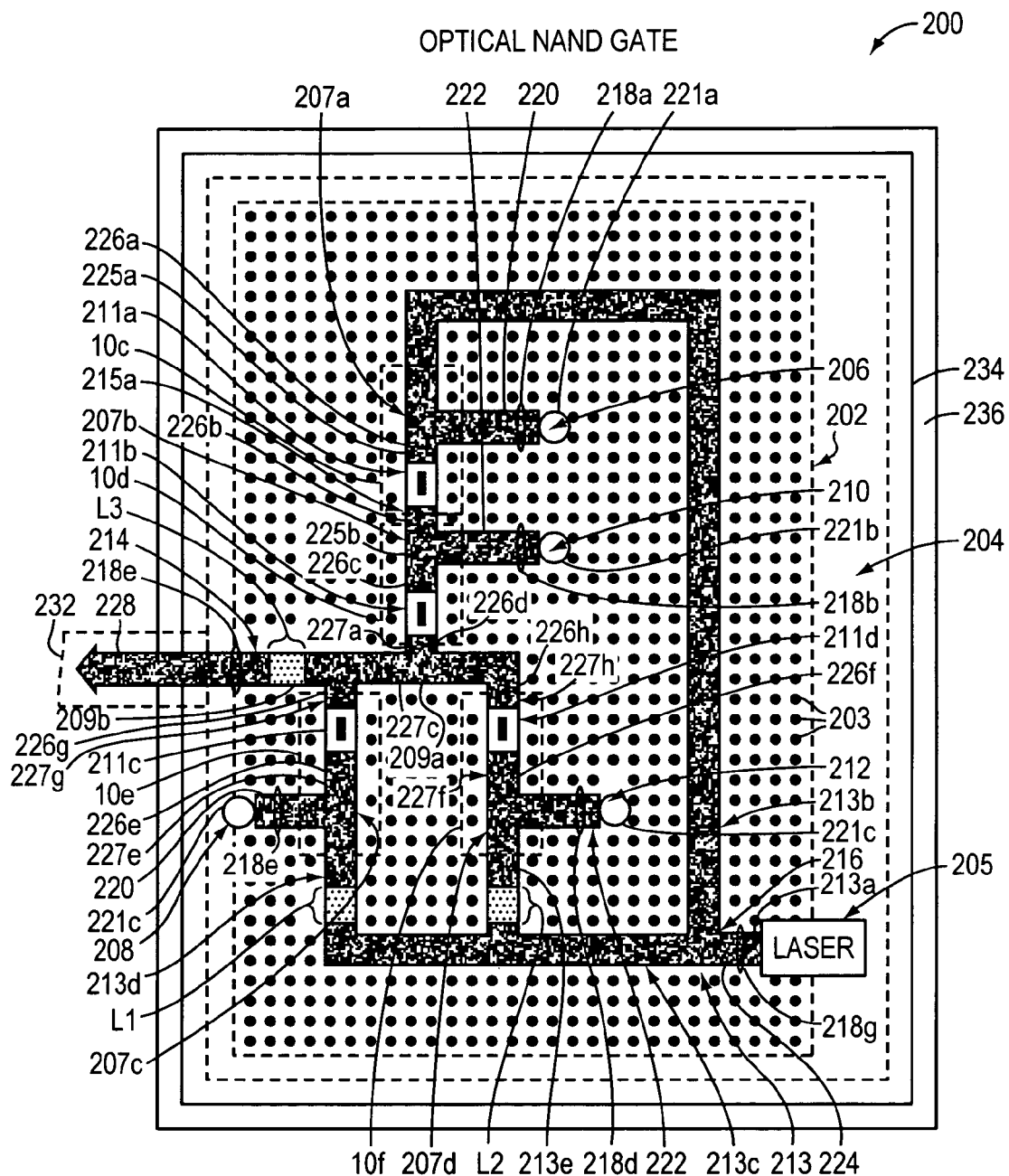

FIG. 7 is a plan view of an optical NAND gate in accordance with the invention, incorporating photonic transistors therein.

Figure 8:
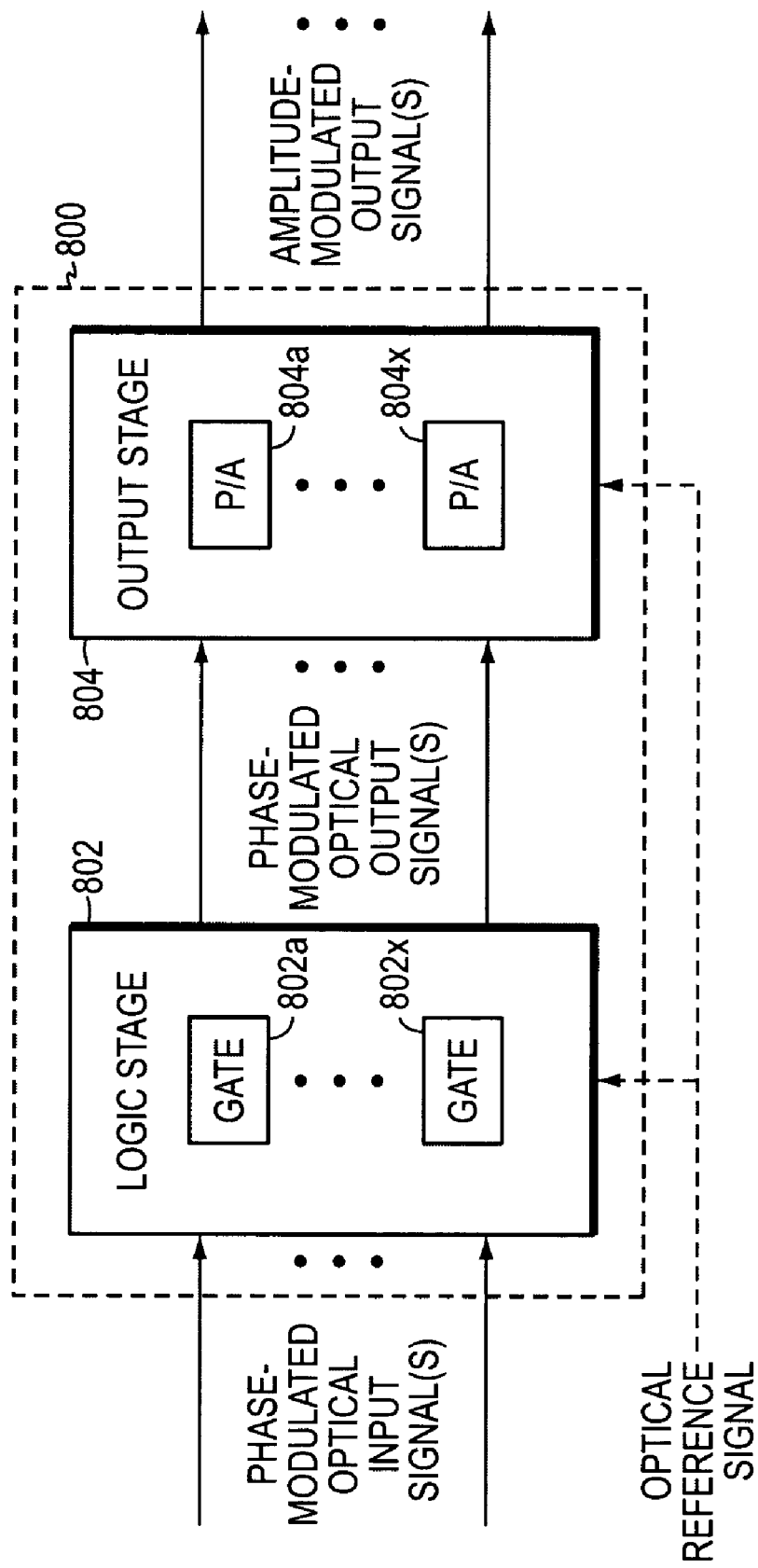

FIG. 8 is a block diagram of an optical circuit including a logic stage that processes one or more phase-modulated optical input signals, and an output stage that converts the phase-modulated optical input signal(s) into an amplitude-modulated optical output signal(s).

Figure 9:
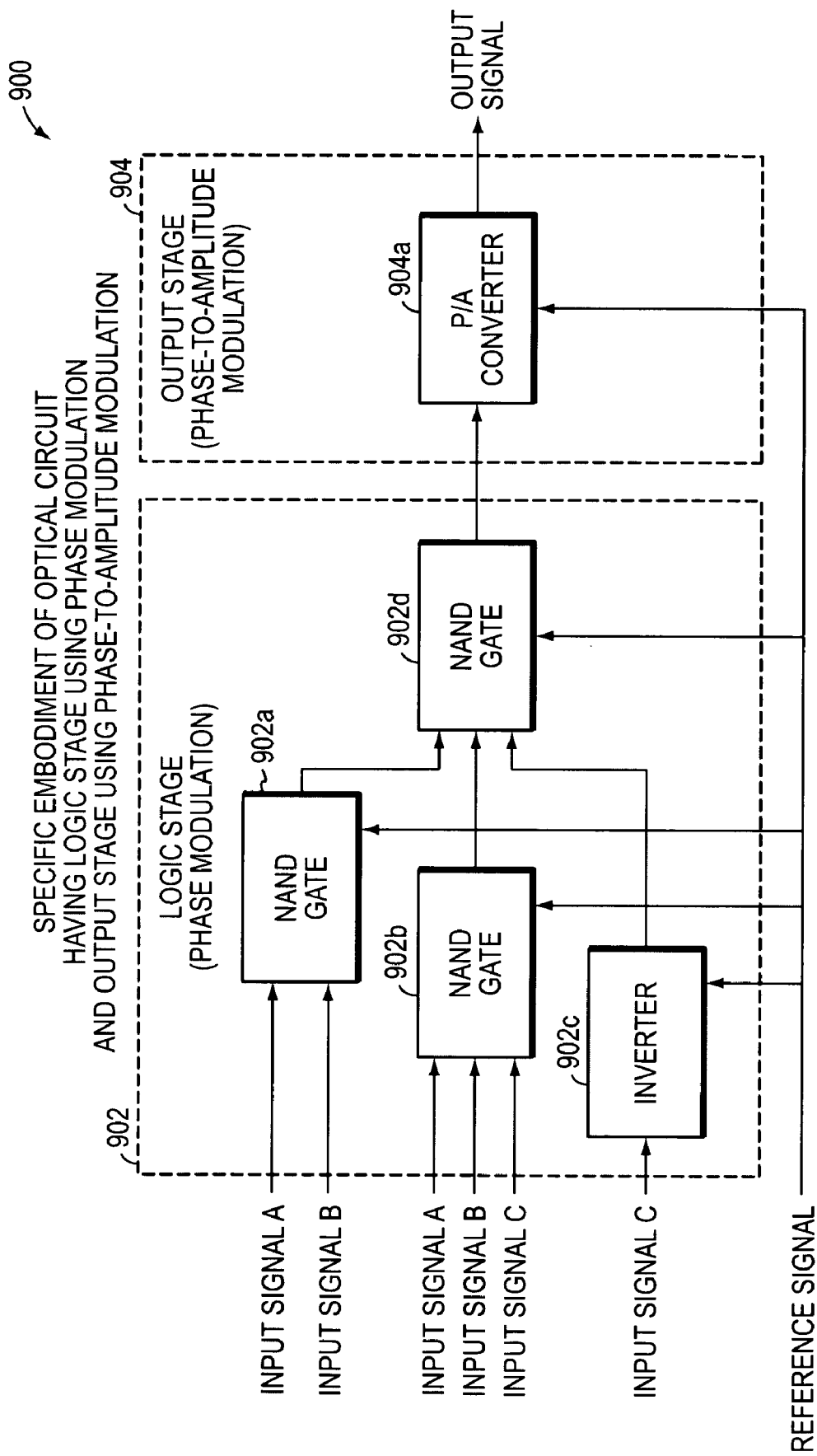

FIG. 9 is a block diagram of a specific embodiment of an optical circuit in accordance with the invention which includes a logic stage using phase modulation to perform Boolean logic on optical input signals, and an output stage receiving an output signal from the logic stage and converting its phase modulation into amplitude modulation.

Figure 10:
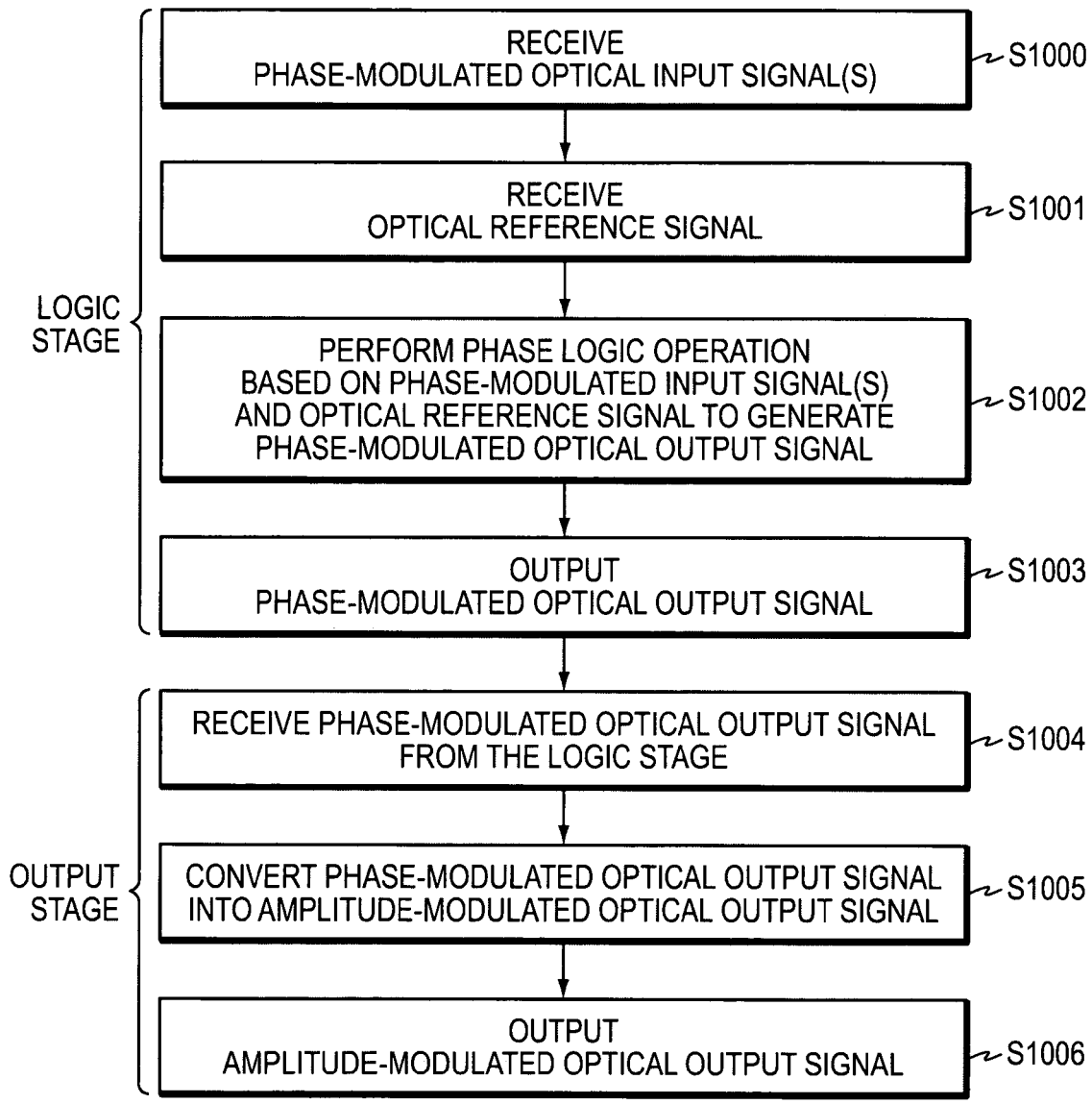

FIG. 10 is a general method that can be performed by an optical logic circuit in accordance with the invention which includes a logic stage and an output stage.

DESCRIPTION OF THE PREFERRED EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Definitions

'And/or' means 'one, some, or all' of the things immediately preceding and succeeding this phrase. Thus, 'A, B and/or C' means 'any one, some or all of A, B, and C.'

'Downstream' refers to a position or element that is further along an optical transmission path relative to a reference point. It can also used to refer to the direction of travel of light in an optical device away from a reference point.

'Substrate' is a workpiece or starting material upon which a photonic bandgap (PBG) element is formed, or which supports a guiding element. The substrate can be composed of one or more of numerous substances including silicon (Si), silicon dioxide ($SiO_2$), gallium arsenide (GaAs), gallium (Ga), boron (B), phosphorus (P), gallium phosphide (GaP), gallium nitride (GaN), and possibly other materials.

'Upstream' refers to a position or element that is at a position toward the origination of light in an optical device or circuit relative to a reference point. It can also refer to a direction toward the origination of light.

'(s)' or '(ies)' means one or more of the thing meant by the word immediately preceding the phrase '(s)'. Thus, "length(s)" means "one or more lengths."

Methods

FIG. 1 is a general method of the invention for generating an amplitude- or phase-modulated optical output signal using an optical input signal having a modulated phase to represent digital logic states. The method of FIG. 1 can be implemented using an exemplary optical device 10 such as is shown in FIGS. 3, 4, 6 and 7.

In Step S10 of FIG. 1 a first optical input signal having phase modulation is received. The phase modulation of the first optical input signal is used to represent its digital logic states. For example, a zero phase shift can represent a high or "1" digital logic state and a phase shift of $\pi$ radians, for example, can represent a low or "0" digital logic state. The first optical input signal can be in the form of a series or train of phase shifts that represent a serial digital input. The first optical input signal can be composed of single-mode, polarized light, for example. In Step S11 a second optical input signal is received. The second optical signal can be an optical reference signal relative to which the phase-modulation of the first optical signal is performed. Alternatively, it is possible that the second optical signal can itself be phase-modulated to represent digital logic states so that both input signals are phase-modulated. The second optical input signal can be composed of single-mode, polarized light of the same mode and polarization as the first optical input signal. In Step S12 the phase-modulated first optical input signal is guided. This step can be performed by a photonic bandgap (PBG) element or other component that has the ability to confine light along pathways that can turn abruptly. Other options for the element include integrated electronic micro-polymer substance, dielectric waveguides, and others. In Step S13 the second optical signal is guided. This can be performed by the same or similar element to those described above with respect to the previous Step S12. In Step S14 the phase-modulated first optical input signal is filtered to eliminate or at least reduce wavelengths that may otherwise cause noise or disturb the first optical input signal. In Step S15 the second optical input signal is filtered to eliminate or at least reduce light at wavelengths outside those of the first and second optical input signals that may otherwise constitute or produce noise or other disturbance of the second optical input signal. The filtering of Steps S14 and S15 can be done by a photonic bandgap (PBG) element of an optical device. In Step S16 the first and second optical input signals are combined to generate an optical interference signal which has amplitude-modulation that is dependent upon the phase-modulation of the first optical signal, and optionally also the second optical input signal if it is phase-modulated. In Step S17 nonlinear discrimination is performed to determine logic states of the analog optical interference signal in order to generate the digital optical output signal. This amounts to making a decision as to whether the amplitude of the optical interference signal denotes one logic state or the other. Linear discrimination of more than two logic levels is thus avoided in the method. Finally, in Step S18 the method of FIG. 1 concludes by outputting the optical output signal. The outputting step can be used to provide the optical output signal to a downstream element such as another optical device. Alternatively, the output element can be a transmission medium such as an optical fiber or waveguide.

FIG. 2 is another more specific method of the invention. The method of FIG. 2 can be carried out by an optical device 10 such as that illustrated in FIG. 3. In Step S20 the method of FIG. 2 comprises generating a first optical input signal. This can be done by a light source such as a laser which generates coherent light. Ideally, this light should be polarized with single-mode, although this is not to exclude the possibility that light of other properties may be used. In Step S21 the first optical input signal is focused. This can be accomplished with a focusing element such as a convex lens. In Step S22 the first optical input signal is received. This step can be done by the input opening of a pathway defined in an optical device 10. In Step S23 the phase of the first optical input signal is modulated. This can be done by a phase modulation element such as a piezoelectric unit. The piezoelectric unit can be responsive to an electric modulation signal that defines the phase modulation to be obtained through the expansion or constriction of the piezoelectric unit which modifies the effective path length experienced by the first optical input signal. Effective path length is defined as the index of refraction of the material and/or medium through which the first optical input signal travels multiplied by the length(s) of the material and/or medium. Alternatively, the phase modulation element can comprise an optical modulation element that receives an optical modulation signal and changes its index of refraction in response to the amplitude of the optical modulation signal to produce the phase-modulation of the optical input signal. In Step S24 the first optical input signal is guided. This step can be accomplished by a pathway free or relatively free (except for perhaps a filter) of periodic structures of a guiding element, which enable the first optical input signal to travel along the pathway with less attenuation than otherwise. In Step S25 the first optical signal is filtered. This can be accomplished by the guiding element itself due to the filtering of the first optical input signal caused by its periodically-spaced structures. In addition, the filtering of the first optical input signal can be performed by the presence of periodic structures in the pathway followed by the first optical input signal, that permit only the wavelength of the optical input signal to propagate in the guiding element.

Steps S26-S31 of FIG. 2 are similar to respective steps S20-S25, but are performed for the second optical input signal. In Step S26 the second optical input signal is generated. This can be accomplished by a light source such as a laser. Optimally, the second optical input signal should be single-mode and polarized the same as the first optical input signal, although this is not to exclude other possibilities. In Step S27 the second optical input signal is focused. This step can be accomplished by a focusing element such as an optical lens to focus the second optical input signal onto an input opening of the optical device. In Step S28 the second optical input signal is received. This can be accomplished by the input opening to the optical device. In optional Step S29 the phase of the second optical input signal can be modulated. This can be done if both the first and second optical input signals are to be modulated to contain phase-represented data. In Step S30 the second optical input signal is guided. This step can be performed by a pathway defined within the optical device that is free or relatively free (except for a filter) of periodic structures of the guiding element. In Step S31 the second optical input signal can be filtered. This can be performed by the structures constituting the guiding element. In addition, the filtering can be performed by one or more structures positioned in the pathway defined for the second optical input signal.

In Step S32 the phase-modulated first optical input signal and the second optical input signal (whether it is a phase reference or is itself phase-modulated) are combined together to generate an optical interference signal. The optical interference signal has an amplitude that is modulated according to the phase-modulation of the first optical input signal, and optionally also the second optical input signal. In Step S33 the logic states of the optical interference signal are nonlinearly discriminated in order to generate the optical output signal. This can be performed by a nonlinear element that permits no light output unless the amplitude of the optical interference signal exceeds a threshold level defining the dividing point between high- and low-amplitude logic states. In Step S34 the optical output signal is guided for output. This can be performed by an output pathway of the optical device that is free of periodic structures of the guiding element. In Step S35 the optical output signal is focused on an output element to which the optical output signal is to be passed. Finally, in Step S36 the optical output signal is output. The optical output signal can be output by the optical device to an output element such as an optic fiber and/or another optical device, for example.

Because in this embodiment the optical output signal is amplitude-modulated, it comports with most devices used in the optical industry which represent optical data with amplitude-modulated signals.

It should be appreciated that because interference between two or more optical input signals is used to generate the output signal using phase modulation, the logic state of the optical output signal can be maintained stably for as long as a particular use of the method requires. Thus, despite the propagating nature of light, use of phase modulation of the input signal, interference, and nonlinear discrimination results in an optical output signal having stable digital states that can persist as long as desired, as opposed to being valid for only one limited interval of time as with previous technologies. In addition, because the optical output signal is amplitude-modulated, it is compliant with most optical equipment used in the telecommunications, computing, and information technology industries.

Optical Device

FIG. 3 is a view of a photonic device 10 in accordance with one embodiment of the invention. Because this device 10 functions as an optical switch, the device 10 may be referred to herein as a 'photonic transistor'.

In FIG. 3 the photonic device 10 comprises a guiding element 12. The photonic device 10 can comprise a substrate 14 upon which the guiding element 12 is formed. The guiding element 12 can be a photonic bandgap (PBG) element composed of periodically-spaced structures 16 arranged in an array on the substrate 14. The structures 16 are fixed at one end or side thereof to the substrate 14, and extend upwardly from the substrate 14 so that light traveling transversely to such structures 14 (thus, parallel with the upper major surface of the substrate) encounters and reacts to the presence of the structures according to the wave properties of light.

The spacing of the structures 16 from each adjacent structure is preferably made to be:

$$\text{structure spacing} = \frac{\text{wavelength of light propagating in structures}}{\text{effective index of refraction of structures}}. \quad (1)$$

Hence, for example, in the specific case in which the optical input signal and the optical reference signal are implemented from light with a wavelength of 1.55 microns, and the structures 16 are composed of silicon (Si) with an index of refraction of approximately 3.5 for light at a wavelength of 1.55 microns, the spacing of the structures 16 can be made to be (1.55 microns/3.5)=0.44 microns. Thus, for a guiding element 12 formed from silicon (Si), the structures 16 can positioned at periodic spacing of 0.44±0.04 microns relative to their nearest neighboring structures 16, in order to operate effectively using light of 1.55 micron. The spacing of the structures 16 is measured from the centers of adjacent cylinders. The width or diameter of the structures 16 shifts the band gap in wavelength and changes attenuation properties. Specifically, a larger structure width for a given structure spacing lowers the wavelength of the band gap and increases attenuation assuming the refractive index of the material composing the structure (e.g., silicon) is greater than that of the medium between the structures (e.g., air). Conversely, a smaller structure width for a given structure spacing shifts the wavelength of the band gap upward for light that can exist in the guiding element 12, and also decreases its attenuation. In terms of the height of the structures 16 extending upwardly from the substrate's upper surface, the structures can be made to a height at least as great as the beam diameter of the optical signals traveling in the guiding element 12. In terms of their width or diameter, the structures 16 can be made sufficiently large so that the optical signals interact with such structures, yet at the same time should not be so wide or large in diameter to attenuate the optical signals too severely to be detectable at the output of the device 10. Typically, the width of the structures can be 20-50% of the spacings of the structures 16, for example.

The structures 16 can have numerous configurations. For example, the structures 16 can be cylindrical or rod-like, with ends attached to or integrally formed with the substrate 14. Alternatively, or in addition, the structures 14 can have a cube, parallelepiped, spherical or semi-spherical (e.g., the form of a sliced sphere such as a hemisphere) configuration, for example. In the case in which the structures 16 are initially separate elements from the substrate 14, the structures 16 can be attached to the substrate 14 using adhesive, brazing, welding, sintering, or other techniques used in nanotechnology processing, for example. Alternatively, the structures can be formed integrally on the substrate 14 in one of numerous ways. For example, the structures 16 can be formed using a lithographic technique involving spinning a uniformly thick photo-sensitive resist layer onto the substrate 14 with a spinning machine, exposing the resist layer to light patterned by a mask with a lithography projection system, developing the resist layer with a chemical substance, hardening the resist layer by baking it in an oven, and selectively etching the substrate in areas not protected by the resist layer, to form the structures 16. The etching can be carried out by reactive ion etching (RIE) or chemical etching in process chambers, as is well known in the semiconductor, micro-electronics, micro-optics, nanotechnology, and other industries. Alternatively, or in addition, electron beam lithography can be used to machine the structures 16 from the substrate 14. This technique is relatively precise although is generally more time-consuming than RIE or chemical etching given the state of existing technology. As yet another option, the substrate 14 can be masked using a resist layer to form areas in which material (silicon, for example) can be deposited using metal oxide chemical vapor deposition (MOCVD) or other deposition technique. Other suitable techniques for forming the structures 16 are well-known or may readily occur to those of ordinary skill in the art.

Use of materials such as silicon (Si) or gallium arsenide (GaAs) to form the guiding element 12 is advantageous from the standpoint that there are numerous mature technologies for processing such materials in order to produce the structures 16 in the guiding element 12. However, this is not in any way intended to limit application of this invention to only the use of silicon (Si) or gallium arsenide (GaAs) to form the guiding element 12, as there are numerous other substances or substance combinations and corresponding well-known processing technologies that can be used to form the structures 16.

Due to the refractive index differences between the material composing the structures 16 and the surrounding medium 19, as well as the spacing of the structures 16 from one another, light propagating in the guiding element 12 is limited to only open areas such as the pathways 18, 20, 24 and interference area 26. Elsewhere in the guiding element 12, light is highly attenuated. A consequence of this fact is that the structures 16 of the guiding element 12 also reject light of wavelengths outside of those which can exist in such guiding element 12. Thus, optical noise that would otherwise degrade the signal-to-noise ratio (SNR) of the optical device 10 is significantly attenuated by the guiding element 12. Therefore, in addition to permitting transmission of light of wavelengths for which the guiding element 12 has been designed, the guiding element 12 also filters out wavelengths that are not of interest or may be considered noise that would otherwise degrade the SNR of the optical signals traveling in the guiding element 12.

The pathways 18, 20 can be formed by the absence of some or all structures 16 along such pathways, thus providing transmission paths that attenuate light to a lesser degree as compared to other directions in which the light may travel in the guiding element 12. Normally, the medium 19 filling the pathways 18, 20 is ambient air. However, in some applications in which less attenuation of the light is desired and economic considerations so permit, it may be desirable to evacuate the air medium from the inside of the device 10 with a pump during manufacture to create a vacuum within the optical device 10, in which case the optical device 10 is formed as an airtight enclosure. The optical device 10 can comprise a cover 21 placed over and adhered, brazed, welded, sintered, screwed or otherwise fixed to peripheral ridge 23 of substrate 14 to seal the guiding element 12 in an airtight manner. Use of the cover 21 may in any case be advantageous to protect the guiding element 12 and other components as well as to prevent dust or debris from reducing performance of the optical device 10.

In FIG. 3, the guiding element 12 is formed to define pathways 18, 20. At their input ends, the pathways 18, 20 receive and permit transmission of a first optical input signal 22 and a second optical input signal 24, respectively. The first and second optical input signals 22, 24 should ideally be polarized, single-mode light, although this does not exclude use of other types of light. The first optical input signal 22 can be received by the optical device 10 in a form that is phase-modulated to represent data by different digital logic states. Alternatively, the optical device 10 can comprise a phase modulation element 15 to phase-modulate the first optical input signal according to a first modulation signal. The phase modulation element 15 is illustrated in broken line to signify that is optionally included in the optical device 10, and may not be necessary in the case in which phase modulation of the first optical input signal 22 is performed by an element upstream of the optical device 10. The first modulation signal can be electric in which case the phase-modulator 15 can be implemented as a piezoelectric unit that modifies the effective path length that is experienced by the first optical input signal 22, and thus changes its phase. Alternatively, the first modulation signal can be optical in which case the phase modulation element 15 can be implemented as a material that changes its refractive index according to the optical intensity of the first modulation signal. Optically-stimulated materials that can be used for this purpose include materials that are electro-optic, i.e., can absorb the incoming light and generates free electrons and/or holes. The presence of the electrons and/or holes changes the refractive index of the electro-optic material. Methods for their manufacture and use are well-known to those of ordinary skill in the art. Regardless of how phase modulation of the first optical input signal 22 is accomplished, its phase represents the digital logic state of the signal. Thus, for example, a zero radian phase shift of the optical input signal 22 relative to the optical reference signal 24 can denote logic level "1" whereas a $\pi$ radian phase shift of the optical input signal 22 relative to the optical reference signal 24 can denote logic level "0".

The second optical input signal 24 can be a reference signal that carries no digital data, but is instead used to establish a reference phase against which the phase of the first optical input signal 22 can be compared. Alternatively, the second optical input signal 22 can itself be modulated within or without the optical device 10. In the case in which the modulation of the second optical input signal 24 occurs within the optical device 10, the optical device 10 can comprise a phase modulation element 17 which is indicated in broken line to indicate that it is an optional element. As with the phase modulation element 15, the element 17 can be electrically or optically driven. Thus, the second modulation signal can be electronic in which case the phase modulation element 17 can be implemented as a piezoelectric unit, for example, to vary the phase of the second optical input signal according to the digital state of the second modulation signal. Alternatively, the second modulation signal can be optical in form, in which case the amplitude or intensity of the second modulation signal is directed to the phase modulation element 17. In this case, the phase modulation element 17 is implemented as a material that changes its index of refraction in dependence upon the amplitude or intensity of the second modulation signal 29 in order to vary the phase of the second optical input signal according to the state of the second modulation signal 29.

The optical input signal 22 and optical reference signal 24 travel via respective pathways 18, 20 to the interference area 26 where they meet and interfere with one another. Unlike the first optical input signal 22 (and optionally the second optical input signal which can also be phase-modulated), the resulting optical interference signal 28 is amplitude-modulated. More specifically, if a zero phase shift exists between the first optical input signal 22 and the second optical input signal 24, which coincides with the state of the second optical input signal 24, the first and second optical input signals 22, 24 constructively interfere in the interference area 20 to produce the optical interference signal with an amplitude that is the sum of the amplitudes of the optical input signal and the optical reference signal. Conversely, if a phase shift of $\pi$ radians exists between the first and second optical input signals, then the optical input signal and the optical reference signal destructively interfere so that the amplitude of the optical interference signal is the difference between the amplitudes of the first and second optical input signals. Ideally, the first and second optical input signals have the same (or close to the same) amplitude so that the optical interference signal has a logic level "1" that is twice the amplitude of either signal, and a logic level "0" that is zero. This enables the logic levels "1" and "0" to be readily nonlinearly discriminated between the two signals by nonlinear element 30. This does not, however, exclude the possibility that the optical input signal and optical reference signal can be of significantly different amplitudes and yet be used effectively in the optical device 10. However, if the amplitude of one of the optical input signal and the optical reference signal is significantly larger than the other, then nonlinear discriminating between logic states can be more difficult because the change in signal amplitude due to constructive or destructive interference is less detectable.

From the interference area 26, the optical interference signal 28 travels to the nonlinear element 30. The nonlinear element 30 functions to nonlinearly discriminate between the logic levels "1" and "0" from the analog amplitude of the optical interference signal 28. The nonlinear element 30 can be implemented in a variety of different ways. For example, the nonlinear element 30 can be a grating, quantum dot array, laser, cavity, PBG cavity, amplifying cavity, non-resonant amplifier, etc. that receives the optical interference signal 28. If the optical interference signal 28 is at a logic level "1", then the amplitude of the optical interference signal 28 is sufficient to be transmitted to the output of the nonlinear element 30 to produce a relatively large amplitude in the optical output signal 32 to represent digital logic state "1". Conversely, if the optical interference signal 28 is at a logic level "0", then the amplitude of the optical interference signal 28 is not sufficient to cause the nonlinear element 30 to transmit appreciable light as the optical output signal 32. Accordingly, in this case, the optical output signal 32 generated by nonlinear element 30 has zero (or at least a relatively low intensity compared to the intensity of the digital logic "1" state) to represent the digital logic state "0" state. To limit the wavelength of laser light output as the optical output signal 32, the nonlinear element 30 can be implemented as a distributed-feedback (DFB) laser. The DFB laser incorporates a grating that limits wavelength of light output as the optical output signal 32. The DFB grating should be designed to be effective to generate laser light at the wavelength of the optical interference signal 28 received as its input, or more generally, the wavelength of light that can be transmitted in the guiding element 12. The laser can receive electric power from a conductor 33 attached to an external power supply (not shown in FIG. 1). The nonlinear element 30 would be ideally be implemented as a laser if necessary to boost the output power of the optical output signal 32. Feeding the output of such a boosted optical output signal 32 into another cascaded photonic transistor in a logic circuit can make it difficult to nonlinear discriminate logic states in such downstream photonic transistors. However, if the guiding channel has significant attenuation, boosting the signal may be needed to maintain appreciable input intensities at the next transistor's input. Moreover, if the nonlinear element 30 of the optical device 10 is the last element encountered by the optical output signal 32 prior to transmission to another external device, then implementation of the nonlinear element 30 as a laser can be advantageous to ensure a strong output signal 32 for use by a downstream device.

The guiding element 12 defines an output pathway 34 which receives and guides the optical output signal 32 from the nonlinear element 30 to the output of the device 10. Like the pathways 18, 20, the output pathway 34 can be formed be the absence of (or fewer) structures 16 along its extent, thus providing a relatively low attenuation of light traveling along the output pathway 34. The phase of the optical output signal 32 at the output of the device 10 can be defined by the length of the output pathway 34 from the output end of the nonlinear element 30 to the output of the optical device 12. Thus, the coupling of the optical device 12 to an output element to receive the optical output signal 32 can be done so as to match a target phase desired as the input to such output element to which the optical device 10 is optically coupled.

FIG. 4 is a cross-sectional view of the optical device 10 taken along the plane A-A' in FIG. 1. As shown in FIG. 2 the structures 16 extend upwardly from the upper surface of the substrate 14. The ridge 23 also extends upwardly from the substrate 14. The structures 16 and the ridge 23 meet flushly with the cover 21. The substrate 14 and the cover 21 as well as the structures 16 can be formed of a material that is reflective to the wavelength of the first and second optical input signals 22, 24 to reduce attenuation of these signals that would otherwise occur if these elements were opaque to the signals. As previously described, the substrate 14 defines an interference area 26 at which the first and second optical input signals 22, 24 meet and interfere, resulting in the optical interference signal 26. The nonlinear element 30 receives and nonlinearly discriminates the optical interference signal 28 to produce the optical output signal 32 which passes out of the device 10 via the output pathway 24. Medium 19 such as ambient air occupies spaces between structures 16, the pathways 18, 20, 24, and the interference area 26. Alternatively, as previously described, the air medium 19 can be evacuated from the device 10, in which case the device 10 must be sealed in an air-tight manner. Also shown in FIG. 2, a cross-section of the conductor 33 insulated by insulator 35 which surrounds the conductor 33 is shown. This is an optional element used that can be used to power the nonlinear element 30 in the instance in which it is implemented as an element such as a laser requiring power for operation. The insulator 35 can be formed in the substrate 14 in numerous ways. For example, if the substrate 14 is formed of silicon, a trench 36 can be formed in the substrate 14 by reactive ion etching, wet etching, and/or chemical etching. Areas other than the trench 36 can be masked by a resist layer and the trench 36 exposed to oxygen in a process chamber. The insulator layer 35 can thus be formed. Another resist layer can be used to selectively deposit the conductor 33 such as gold (Ag), platinum (Pt), aluminum (Al), copper (Cu) or other metal or alloy in order to form the conductor 33. The conductor 33 is electrically connected at one end to the nonlinear element 30 and at its other opposite end is electrically connected to an external power supply.

FIG. 5 is a graph of output electric field magnitude for the optical output signal 32 output by the nonlinear element 30 relative to the input electric field magnitude of the optical interference signal 28 received by the nonlinear element 30. As can be seen from FIG. 3 the magnitude of the phase-modulated optical input signal 22 and the optical reference signal 24 are relatively close to one another in magnitude so that constructive interference results in a magnitude of the optical interference signal 32 that is twice the amplitude of either signal, representing a digital logic "1" state. Conversely, if the first and second optical input signals are $\pi$ radians out-of-phase, then the optical output signal 32 generated by the optical device 10 has a "0" or low logical state. By implementing the nonlinear element 30 so that its trigger point is at 1.5 times the amplitude of the first and second optical input signals 22, 24, an amplitude of the optical interference signal 28 that is significantly less than 1.5 times the amplitude of either of the first and second optical input signals 22, 24 can be nonlinearly discriminated as a low or "0" logic state whereas an amplitude significantly more than 1.5 times the amplitude of either of the first and second optical input signals 22, 24 can be nonlinearly discriminated to be in a logical high or "1" state. This is not intended to exclude the possibility that the threshold level at which the nonlinear element 30 nonlinear discriminates the level of the optical output signal 32 can be set to other effective levels, such as any value over 1.0 times the amplitude of the first and second optical input signals, for example.

It can be proven that a Boolean logic expression can be implemented electronically or photonically with at most two cascaded levels NAND gate(s) with as many inverter(s) as needed to implement the logic. FIGS. 6 and 7 are photonic inverter and NAND gates, respectively, that can be used as the basis to implement an optical circuit to map logical states of optical input signals to a logical state of an output signal according to specified Boolean logic. The gates of FIGS. 6 and 7 can thus be used to implement virtually any Boolean logic expression by connection together as appropriate. These gates can be constructed similarly to the photonic transistor 10 of FIG. 3. However, importantly, in the logic gates, the output of the photonic transistor(s) in the gates is phase-modulated: nonlinear amplitude discrimination is used to determine whether any output carrying phase-modulated signal is present at the output of a photonic transistor. Thus, in a logic gate, the output signal of a photonic transistor has a phase-represented logic state.

Optical Logic Gates and Circuit

FIG. 6 is a plan view of a photonic logic gate 100 which functions as an inverter. More specifically, the gate 100 produces a phase-modulated output signal that has a logic state that is inverted relative to the logical state of the phase-modulated optical input signal. The circuit 100 comprises two photonic transistors 10a, 10b including interferences areas 107a, 107b defined in guiding element 102, and nonlinear elements 110a, 100b. The guiding element 102 can be formed on a substrate 104 of the photonic logic gate 100, and can comprise periodically-spaced structures 103 if implemented as a PBG element. The guiding element 102 defines input pathway 106 comprising an input section 106a that separates into sections 106b, 106c. The guiding element 102 also comprises an input pathway 108 composed of sections 108a, 108b which meet with sections 106b, 106c at respective interference areas 107a, 107b. The circuit 100 also comprises nonlinear elements 110a, 110b positioned in respective sections 112a, 112b receiving light from respective interference areas 110a, 110b. Finally, the guiding element 102 defines an output pathway 114 extending from where the sections 112a, 112b meet to the output of the photonic logic gate 100. The length of the output pathway 114 can be defined so as to achieve a desired phase for the optical output signal 128 at the input of a downstream element 132. Note that because the guiding element 102 is implemented as a PBG element in this example, the optical signals propagating in the gate 100 can take very abrupt turns. This is advantageous from the standpoint of reducing the area occupied by the gate 100 on the substrate 104. More specifically, the ability to turn at an angle of $\pi/3$ radians or greater can be used to implement relatively complex optical circuits in a relatively small area of a substrate rather than requiring use of mirrors or elongation of the gate configuration along the direction of propagation of light to avoid sharp turns that would cause light to escape a waveguide. The optical inverter 100 of FIG. 6 can define a peripheral ridge 136 upon which is positioned cover 134 to protect the elements of the photonic logic gate 100.

In the exemplary embodiment of FIG. 6, the input pathway 106 including sections 106a, 106b, 106c, input pathway 108 including sections 108a, 108b, 108c, interference areas 107a, 107b, and intermediate sections 112a, 112b, 124a, 124b, and output pathway 114 are formed by the absence of structures 103 along their extents, rendering these pathways relatively transmissive. Outside of the pathways, light is greatly attenuated. The guiding element 102 tends to filter the light traveling in its pathways so that only light of the wavelength for which the photonic gate 100 was designed can propagate within it. By attenuating light in areas outside of the transmissive pathways and interferences areas of the gate 100, multi-path effects and crosstalk between different photonic circuits and pathways can be avoided to achieve optical isolation of the photonic transistors and circuits formed on a substrate. The combined length of all joined pathways (namely, combined pathways 108a, 108b, 125a, 112a, combined pathway 106a, 106b, 125a, 112a, combined pathway 108a, 108c, 125b, 112b, and combined pathway 106a, 106c, 125b, 112b) from the points of input of the optical input signals 120, 122 to the output of pathway 114 at the junction of the sections 112a, 112b, is equal to $(\lambda/RI)*m$ in which $\lambda$ is the wavelength of the optical input signals 120, 122, RI is the index of refraction of the material composing structures 103, and m is a positive integer. The phase-shift element L1 can be provided in the input pathway 108a of the guiding element 102, to invert the phase of the optical reference signal 122 output by the phase-shift element L1 by π radians relative to its input. Similarly, phase-shift elements L2, L3 can be provided in sections 112a, 112b. The phase-shift elements L1, L2, L3 are of a length $(\lambda/RI)/2$ in which λ is the wavelength of the optical input signals 120, 122, RI is the index of refraction of the material composing the respective element L1, L2, L3.

The phase-modulated optical input signal 120 is received by the photonic logic gate 100 from an external source at the input pathway 106. The external source can be an input element such as either or both of an optical fiber or the output of an upstream optical device, for example. It can be coupled in a light-tight manner to the input pathway 106 by feeding an optical fiber into the input pathway 106 and sealing the same with epoxy, a coupler, or other light-tight fitting. Aperture 135 defined in the cover 134 can be used to permit passage and coupling of the optical fiber for this purpose. The photonic logic gate 100 can comprise a lens 118a to focus the optical input signal 120 from the external source into the input pathway 106. The lens 118a can be used to enhance the coupling coefficient of the optical input signal 120 input to the input pathway 106. The phase-modulated optical input signal 120 travels down input sections 106a, divides into sections 106b, 106c, and travels to respective interference areas 107a, 107b.

The photonic logic gate 100 can also comprise a light source 105 such as a laser. The light source 105 generates a second optical input signal 122, in this case an optical reference signal, relative to which the phase of the optical input signal 120 can be determined. The coherence length of the laser should ideally be longer than the path traveled by the light it generates to the output of the optical circuit of which the gate 100 is a part (the same constraint applies to the optical input signal 120, i.e., it must be coherent along the path of its travel from the input to the output of the optical circuit of which the gate is a part). The second optical input signal 122 travels from source 105 down section 108a, divides into sections 108b, 108c, the portion traveling in section 108a is phase-shifted by element L1, and the light in sections 108b, 108c travels to the respective interference areas 107a, 107b. In these areas, the first and second optical interference signals 120, 122 meet and interfere to produce optical interference signals 124a, 124b. These signals 124a, 124b are nonlinearly discriminated by respective nonlinear elements 110a, 110b to produce optical output signals 126a, 126b which travel in sections 112a, 112b extending from respective interference areas 107a, 107b to the output pathway 114 where the sections 112a, 112b meet. The signals 124a, 124b are phase-shifted by respective elements L2, L3 in corresponding sections 112a, 112b.

The optical logic gate 100 of FIG. 6 operates so that if the phase-represented logic state of the optical input signal 120 is high or "1" then the phase-represented output signal 128 has a low or "0" state. Conversely, if the phase-represented logic state of the optical input signal 120 is low or "0" then the phase-represented output signal 128 has a high or "1" logic state.

More specifically, if the logic state of the output input signal 120 is high or "1", then the optical input signals 120, 122 destructively interfere at interference area 107a due to the phase-shift induced by element L1. This produces an optical interference signal 126a that is nonlinearly discriminated to be a no-light condition by the nonlinear element 110a. Thus, effectively no light is provided to the optical interference area 107c from the nonlinear discriminator 110a, and the photonic transistor 10a thus has no impact on the optical output signal 128 in this case. Conversely, a portion of the optical input signals 120, 122 travels down respective sections 106a, 106c and 108a, 108c to meet and interfere in interference area 107b. This produces an optical interference signal 124b that is nonlinearly discriminated by the nonlinear element 110b to produce an optical output signal 126b with a phase-represented logical "1" state represented by a zero radian phase shift relative to the reference signal. The optical output signal is delayed by the phase-shift element L3 with length of $(\lambda/RI)/2$, thus producing an optical output signal 128 with a low or "0" logical state represented by a π radian phase shift relative to the optical reference signal 122. The optical output signal 128 is thus phase-modulated and is suitable for input to a downstream optical device configured to receive a phase-modulated input.

Conversely, if the optical input signal has a low or "0" state, then the signals 120, 122 constructively interfere in area 107a, resulting in the optical interference signal 124a being nonlinearly discriminated by nonlinear element 110a to produce an optical output signal 128 having light with a phase representing a low or "0" logical state. The optical interference signal 124a is provided to the output pathway 114 after phase shift of $(\lambda/RI)/2$ imposed by length L2 which converts the phase-represented logic state into a logical high or "1" state. At interference area 107b, the signals 120, 122 are out-of-phase and thus destructively interfere. Thus, effectively no light passes through the non-linear element 110b so that it has no influence on the optical output signal 114 in this case.

FIG. 7 is an optical NAND gate 200 to perform NAND logic on optical input signals 220, 222. The optical NAND gate 200 comprises photonic transistors 10c, 10d, 10e, 10f comprising respective interference areas 207a, 207b, 207c, 207d and nonlinear elements 211a, 211b, 211c, 211d. The interference areas 207a, 207b, 207c, 207d are defined in the guiding element 202, which in this exemplary embodiment is implemented as a PBG element. The guiding element 202 defines input pathways 206, 208 receiving optical input signal 220 and input pathways 210, 212 receiving optical input signal 222. The respective focusing elements or lenses 218a, 218b, 218c, 218d can be used to focus respective optical input signals 220, 222 into corresponding pathways 206, 208, 210, 212. Optical input signals 220, 222 can be received from an upstream transmission medium or device. These signals can be guided into the device via optical fibers or other waveguides through apertures 221a, 221b, 221c, 221d defined in the cover 234. Such optical fibers or waveguides can be fixed to the cover 234 at apertures 221a, 221b, 221c, 221d in a light-tight manner using adhesive, epoxy, coupler, bushing or other device known to those skilled in the art.

Light source 205 such as a laser generates optical input signal 224 received by pathway 213 defined by the guiding element 202. The optical input signal 224 serves as a reference signal against which the phase of the optical input signals 220, 222 are compared to determine their logic states by the phases of such signals. The coherence length of the light source 205 is ideally greater than the longest path taken by the light it generates through the pathways of the optical device to its output. If the optical device 200 is used with other devices in a circuit, then the coherence length of the laser light should optimally be as long as the longest pathway taken by the optical input signal 224 through the optical circuit. The guiding element 202 defines a pathway 213a which receives the optical input signal 224 and guides the light to pathways 213b, 213c where this light divides. A portion of the optical input signal 224 travels through pathway 213b to interference area 207a where it meets and interferes with optical input signal 220 from the pathway 206. The resulting interference signal 226a travels down pathway 225a defined in the guiding element 202 to the interference area 207b where it meets and interferes with the optical input signal 222 from the input pathway 210. The resulting interference signal 226c travels down pathway 225b where its logic state is nonlinearly discriminated by nonlinear element 211b to produce optical output signal 226d. The resulting signal 226d with determined logic state travels to junction 209a via pathway 227a defined in the guiding element 202. The nonlinear elements 211a, 211b are such that if destructive interference occurs at either of the interference areas 207a, 207b, then effectively no light reaches the junction 209a from the photonic transistors 10c, 10d.

A second portion of the light generated by the light source 205 travels down the section 213c and encounters phase-shift elements L1, L2 in pathways 213d, 213e defined in the guiding element 202. The phase-shift elements L1, L2 impose a ($\lambda$/RI)/2 phase shift on the optical signal 224. From the phase-shift elements L1, L2, the delayed optical input signal 224 travels to respective interference areas 207c, 207d to meet and interfere with respective optical input signals 220, 222. The resulting optical interference signals 226e, 226f are nonlinearly discriminated by respective nonlinear elements 211c, 211d to produce respective optical output signals 226g, 226h. The optical output signal 226h travels to the junction 209a via pathway 227h. From there, one of the optical output signal signals 226d, 226h (they will not simultaneously exist, but are only present if the logical state of the optical input signals 220, 222 so permits) travels down the pathway 227c to the junction 209b. Similarly, the optical output signal 226g travels to junction 209b. Depending upon the logic states of the input signals 220, 222, one or more of the optical output signals 226d, 226g, 226h generated by the input signals 220, 222 travels down the output pathway 214 defined in the guiding element 202 and is output to a downstream optical device or element 232, optionally via the lens 218e, as the optical output signal 228. The optical output signal 228 is the ultimate output of the optical NAND gate 200. Except for the phase-shift elements L1, L2, L3, the pathways followed by the signals 220, 222, 224 from input to output are in the NAND gate 200 are equal to ($\lambda$/RI)*m as previously defined.

Under NAND logic the following truth table applies to the gate 200:

TABLE 1

NAND Truth Table for Gate 200

| Input Signal 220 | Input Signal 222 | Output Signal 228 |
|---|---|---|
| 0 | 0 | 1 |
| 0 | 1 | 1 |
| 1 | 0 | 1 |
| 1 | 1 | 0 |

To confirm that the gate 200 of FIG. 7 behaves in this manner, if the optical input signals 220, 222 are low or "0" state, then the following occurs in the gate 200. The optical input and reference signals 220, 224 travel down respective pathway sections 206, 213a, 213b to the interference area 207a where destructive interference occurs. Hence, effectively no light passes from the interference area 207a down the section 215a to the interference area 207b. The optical input signal 222 travels down pathway 210 to the interference area 207b. Because the amplitude of this signal is insufficient to surpass the amplitude threshold of the nonlinear element 226c, the photonic transistors 10c, 10d have no contribution to the optical output signal 228 if the optical input signals 220, 222 are both in a low or "0" logical state. With respect to the photonic transistors 10e, 10f, the optical reference signal 224 travels from light source 205 down section 213c, and divides into two portions down the sections 213d, 213e where they are delayed by phase-shift elements L1, L2, converting the logical states of these signals to a low or "0" state. The optical input signals 220, 222 travel down respective pathway sections 208, 212 to respective interference areas 207c, 207d where constructive interference occurs. The resulting optical interference signals 226e, 226f travel down respective sections 227e, 227f to the nonlinear elements 211c, 211d, respectively, in which these signals are subjected to nonlinear discrimination. The resulting optical output signals 226g, 226h have a phase-represented low or "0" logical state, and travel down respective pathway sections 227g, 227h, and 227c to the junction 209b where they constructively interfere. The resulting optical output signal 228 is delayed by phase-shift element L3 to invert its logic state, producing an optical output signal having a high or "1" logical state.

If the optical input signal 220 has a low or "0" logical state, and the optical input signal 222 has a high or "1" logical state, then the optical input signal 220 travels down pathway 206 to the interference area 207a, and the optical reference signal 224 travels down the pathway section 213b to the interference area 207a where destructive interference occurs, producing an optical interference signal 226a with a low or "0" logical state that travels down section 225a to the nonlinear element 10c. Because the optical interference signal 226a has insufficient amplitude to overcome the threshold of the nonlinear element 211a, the optical output signal 226a also has a low or "0" logical state. However, the optical input signal 222 has a high or "1" logical state. It travels down the pathway section 210 to the interference area 207b where it destructively interferes with the optical output signal 226b. The resulting optical interference signal 226c is nonlinearly discriminated as a low or "0" logical state by the nonlinear element 226c so that effectively no light reaches the output pathway 214 from the photonic transistors 10c, 10d.

The optical reference signal 224 travels from light source 205 down the section 213c where it divides into sections 213d, 213e, is delayed by phase-shift elements L1, L2, and further travels down sections 213d, 213e to respective interference areas 207c, 207d. Destructive interference occurs at interference area 207d, resulting in no light from the transistor 10f passing to the output pathway 214. The optical input signal 220 travels down pathway 208 and meets and constructively interferes with the phase-delayed optical reference signal 224. The resulting optical interference signal 226e travels down section 227e to the nonlinear element 211c in which it is discriminated. The resulting optical output signal 226g has a low or "0" logical state. It further travels down pathway 227g to the output pathway 214, is phase-delayed by the element L3 to produce an optical output signal 228 with a high or "1" logical state. The optical output signal 228 is thus output with a high or "1" logical state, as expected for an optical input signal 220 with a low or "0" logical state, and an optical input signal 222 with a high or "1" logical state from Table 1 above.

If the optical input signal 220 has a high or "1" logical state and the optical input signal 222 has a low or "0" logical state, then the following occurs in the NAND gate 200. The optical reference signal 213 travels down the section 213b to the interference area 207a where it meets with and constructively interferes with the optical input signal 220 traveling down pathway 206. The resulting optical interference signal 226a travels down section 225a to the nonlinear element 211a in which it is discriminated to have a high or "1" logical state. The resulting optical output signal 215a from the photonic transistor 10c travels down section 226b to the interference area 207b. The optical input signal 222 travels down the pathway 210 to the interference area 207b where it destructively interferes with the optical output signal 215a to produce an optical interference signal 226c with low electric field amplitude. The optical interference signal 226c in this case is nonlinearly discriminated to a low amplitude state so that effectively no light is output from the photonic transistors 10c, 10d to contribute to the optical output signal 228.

Referring now to the photonic transistors 10e, 10f with the optical input signal 220 having a high or "1" logical state and the optical input signal 222 having a low or "0" logical state, the optical reference signal 224 travels down section 213a, 213c, divides into sections 213d, 213e, is phase-delayed by elements L1, L2, and travels to respective interference areas 207c, 207d. The optical input signal 220 travels down pathway 208 to the interference area 207c where it destructively interferes with the phase-delayed optical reference signal 224, producing an optical interference signal 226e with a relatively low amplitude state. The optical interference signal 226e travels down section 227e to the nonlinear element 211c, which nonlinearly discriminates this signal so that effectively no light is output from such element. The photonic transistor 10e thus has no contribution to the optical output signal 228 in this case.

At the photonic transistor 10f, the optical input signal 222 travels down pathway 212 to the interference area 207d where it meets and interferes with the phase-delayed optical reference signal 224. The resulting optical interference signal 226f travels down the section 227f to the nonlinear element 211d. The nonlinear element 211d nonlinearly discriminates the optical interference signal 226f to produce an optical output signal 226h having a phase-represented low or "0" logical state. The optical output signal 226h travels down the sections 227b, 227c to the output pathway 214 where it is delayed by phase-shift element L3, producing an optical output signal 228 with a high or "1" logical state. The NAND gate 200 is thus confirmed to generated an optical output signal 228 with a high or "1" logical state if the optical input signal 220 has a high or "1" logical state, and the optical input signal 222 has a low or "0" logical state.

Finally, the case in which the optical input signal 220 has a high or "1" logical state and the optical input signal 222 has a high or "1" logical state, the following occurs in the optical NAND gate 200. The optical reference signal 224 travels from the light source 205 down the sections 213a, 213b, and the optical input signal 220 travels down pathway 206, to the interference area 207a where these signals meet and constructively interfere, producing an optical interference signal 226a that travels down section 225a to the nonlinear element 211a which nonlinearly discriminates this signal to produce an optical output signal 226b with a high or "1" logical state. The optical output signal 226b travels down the section 225b to the interference area 207b. The optical input signal 222 propagates down pathway 210 to the interference area 207b where it meets and interferes with the optical output signal 226b from section 215a. These signals 222, 226b constructively interfere in this case, producing an optical interference signal 226c that travels down the section 225b to the nonlinear element 211b which nonlinearly discriminates the optical interference signal 226c to produce an optical output signal 226d having a phase-represented high or "1" logical state. The optical output signal 226d travels down the section 227c and is delayed by the phase-shift element L3 which effectively inverts the phase-represented logical state of the optical output signal 226d so that the optical output signal 226d has a low or "0" logical state at the output of the NAND gate 200.

The effect on the photonic transistors 10e, 10f if the optical input signals 220, 222 both have high or "1" logical states is next considered. The optical reference signal 213 travels from the light source 205 through sections 213a, 213c, and divides into sections 213d, 213e where such signals are delayed by the phase-shift elements L1, L2. The resulting phase-delayed signals 224 meet and destructively interfere with respective optical input signals at corresponding interference areas 207c, 207d. The resulting optical interference signals 226e, 226f have insufficient amplitude to pass the thresholds of the nonlinear elements 211c, 211d so that effectively no light is contributed to the optical output signal 228 from the photonic transistors 10e, 10f in this case.

FIG. 8 is a block diagram of an optical circuit 800 comprising logic stage 802 and output stage 804. The logic stage 802 is coupled to receive phase-modulated optical input signal(s), and comprises one or more gates 802a-802x, x being a positive integer. The logic stage 802 can also be coupled to receive an optical reference signal serving as a phase reference for one or more gates 802a-802x. The logic gates 802a-802x can be such as optical inverter gate 100 of FIG. 6 and the optical NAND gate 200 of FIG. 7. In fact, it can be proven that any Boolean logic circuit can be implemented by one or more inverter gates 100 and NAND gates 200. The description of the inverter gate 100 and NAND gate 200 herein is thus advantageous in that these gates can be combined together as necessary to produce any Boolean logic expression. Based on the phase-modulated optical input signal(s), the one or more logic gates 802a-802x generate respective phase-modulated optical output signal(s). The logic stage 802, or more specifically, the logic gates 802a-802x, can be coupled to provide the phase-modulated optical output signal(s) to the output stage 804. The output stage 804 comprises one or more phase-to-amplitude-modulation (P/A) converters 804 coupled to receive respective phase-modulated optical output signal(s), which converts this signal(s) into an amplitude-modulated output signal(s) forming the output of the optical circuit 800. The P/A converter 804 can be such as the optical device 10 of FIG. 3 which converts phase-represented optical input signals into amplitude-modulated optical output signal. Optionally, the output stage 804, or more specifically, the P/A converter(s) 804a-804x, can be coupled to receive the optical reference signal, and generates the amplitude-modulated optical output signal based not only on the phase-modulated optical input signal(s), but also on the optical reference signal. Because much of the optical industry utilizes equipment, transmission media, and protocols that require signals with amplitude-modulation, the optical circuit 800 of FIG. 8 is advantageous in that it can readily perform Boolean logic with optical signals using stable phase-represented logic states in its logic stage 802, to generate an amplitude-modulated output signal(s) in its output stage 804 that is compatible with existing optical infrastructure such as optical fiber cables, transceivers, switches, routers, etc. In addition, because any Boolean logic operation can be performed by the optical circuit, its usefulness in optical computing is readily apparent. Moreover, because the phase-represented logic states are stable, they can be used to store data persistently. These and numerous other benefits and advantages of the invention should now be apparent to those of ordinary skill in the art.

FIG. 9 is an optical logic circuit 900 comprising a logic stage 902 and an output stage 904 for performing a specific logic operation. In this particular example, the optical logic operation is carried out on optical input signals A, B, C to generate an optical output signal with logical states determined by the following Boolean expression:

A*(B*(A+B+C))+C in which '*' represents an AND operation and '+' represents an OR operation. To implement this expression with NAND gates and inverters, double inversion (represented by double bars of Boolean expression) is used to produce the following expression:

$$\overline{\overline{A*(B*(A+B+C))+C}} = \overline{\overline{AB}*\overline{ABC}*\overline{C}}$$

Hence, as shown in FIG. 9, optical circuit 900 comprises a logic stage 902 comprising NAND gates 902a, 902b, and inverter 902c which are coupled to receive respective optical input signals A, B, C and the optical reference signal. The NAND gates 902a, 902b, inverter 902c, and NAND gate 902d can be gates such as those of FIGS. 6 and 7. One can construct a three-input NAND gate by simply adding two photonic transistors, one in series with the photonic transistors 10c, 10d, and one in parallel with the photonic transistors 10e, 10f with a phase-shift element, to receive the additional optical input signal and to provide an optical output signal to the output pathway 214 of the optical device. Additional photonic transistors and phase-shift element(s) can be added in this manner to form a NAND gate accommodating virtually any number of input signals. The NAND gates 902a, 902b, inverter 902c, and NAND gate 902d are coupled to receive an optical reference signal. The NAND gates 902a, 902b and the inverter 902c perform the logic operations $\overline{AB}$, $\overline{ABC}$, $\overline{C}$, respectively, on the received optical input signals A, B, C. The NAND gate 902d is coupled to receive the optical output signals $\overline{AB}$, $\overline{ABC}$, $\overline{C}$ generated by the NAND gates 902a, 902b and the inverter 902c based on respective optical input signals A, B, C, and generates an optical output signal $\overline{\overline{AB}*\overline{ABC}*\overline{C}}$ based thereon. The NAND gate 902d is coupled to receive the optical output signals $\overline{AB}$, $\overline{ABC}$, $\overline{C}$ and the optical reference signal, and generates an optical output signal $\overline{\overline{AB}*\overline{ABC}*\overline{C}}$. In the output stage 904, the phase-to-amplitude (P/A) modulation converter 904a (such as the device of FIG. 4) converts the phase-modulated optical output signal $\overline{\overline{AB}*\overline{ABC}*\overline{C}}$ into an amplitude-modulated optical output signal having an amplitude-modulated representation of the same phase-modulated Boolean logic expression $\overline{\overline{AB}*\overline{ABC}*\overline{C}}$. The phase-modulated optical output signal $\overline{\overline{AB}*\overline{ABC}*\overline{C}}$ is output from the optical circuit 900.

FIG. 10 is a method of the invention performed by an optical circuit such as that of FIG. 8. In step S1000 the phase-modulated optical input signal(s) is received by the optical circuit. In Step S1001 the optical circuit receives the optical reference signal. In Step S1002 the optical circuit performs a phase logic operation based on the phase-modulated input signal(s) and the optical reference signal to generate a phase-modulated optical output signal. In Step S1003 the optical circuit outputs a phase-modulated optical output signal. Steps S1000-S1003 can be performed by the logic stage of the optical circuit. In Step S1004 the optical circuit receives the phase-modulated optical output signal from the logic stage. In Step S1005 the optical circuit converts the phase-modulated optical output signal into an amplitude-modulated optical output signal. In Step S1006 the amplitude-modulated optical output signal is output from the optical circuit. Steps S1004-S1006 can be performed by the output stage 904.

ALTERNATIVES

The spacing of the structures defining the guiding elements disclosed herein can be made other than positive integer multiples of full wavelengths, such as one-half or one-quarter wavelength, for example. With appropriate adjustment of path lengths and delay elements L1, L2, such PBG elements can operate effectively at the wavelength of interest.

Although phase modulation of signals at 0 and $\pi$ radians is disclosed herein, the phase modulation may be done at 0 and $\pi/2$ radians or other distinguishable phase intervals that produce interference signals that permit nonlinear discrimination of binary logic states.

Assignment of logical levels can be done differently than disclosed herein. For example, a logical "0" can be represented by no phase shift of a signal, and a logical "1" can be represented by a phase shift of the signal.

Nor is the specific configuration of the structures 16 spaced in a grid along horizontal and vertical lines intended to limit the invention. The structures 16 could as well be spaced with every other row staggered and centered relative to adjacent rows, as can be seen in the Asakawa publication, for example.

Although the specific PBG elements disclosed herein are two-dimensional structures, it is possible to implement the optical devices disclosed herein with similar functions as previously described using one- or three-dimensional structures, as will be readily apparent to those of ordinary skill in the art with the benefit of the teachings provided herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising the steps of:
   a) receiving a first optical signal at a first pathway defined in a photonic bandgap (PBG) element, the PBG element defined by periodic structures, and the first pathway defined by an absence of structures in the PBG element;
   b) receiving a second optical signal at a second pathway defined in the PBG element, the second pathway defined by an absence of structures in the PBG element;
   c) phase-modulating the first optical signal to contain first data with a first phase modulator mounted in the first pathway of the PBG element;
   d) phase-modulating the second optical signal to contain second data with a second phase modulator mounted in the second pathway of the PBG element;
   e) guiding the phase-modulated first optical signal via the first pathway to an interference area defined in the PBG element;
   f) guiding the phase-modulated second optical signal via the second pathway to the interference area;
   g) combining the phase-modulated first optical signal with the phase-modulated second optical signal in the interference area to generate an optical interference signal that is amplitude-modulated based on the phase modulation of the first optical signal and the second optical signal;

h) nonlinearly discriminating the optical interference signal with a nonlinear element situated in the PBG element and optically positioned between an output of the interference area and an input to an output pathway defined in the PBG element to produce an optical output signal having a digital logic state representing third data resulting from a logic operation on the first data and second data by performance of the steps (g) and (h);

i) guiding the optical output signal to an output of the PBG element via the output pathway; and j) outputting the optical output signal from the PBG element.

2. A method as claimed in claim 1 wherein the optical interference signal is amplitude-modulated based on the phase modulation of at least the first optical signal.

3. A method as claimed in claim 2 wherein the optical interference signal is amplitude-modulated based on phase modulation of the second optical signal.

4. A method as claimed in claim 1 wherein the PBG element defines a pathway that guides the optical interference signal to the nonlinear element that nonlinearly discriminates the optical interference signal to produce the optical output signal.

5. A method as claimed in claim 1 further comprising the step of:
k) generating the first optical signal with a light source.

6. A method as claimed in claim 5 wherein the light source comprises a laser.

7. A method as claimed in claim 1 further comprising the step of:
k) focusing the first optical signal at an input to the first pathway of the PBG element.

8. A method as claimed in claim 7 wherein the focusing is performed by a lens.

9. A method as claimed in claim 1 wherein the first phase modulator performs modulation with a piezoelectric element that changes the effective path length experienced by the first optical signal based on a modulation signal in order to modulate its phase.

10. A method as claimed in claim 1 comprising the step of:
k) filtering the phase-modulated first optical signal with the PBG element.

11. A method as claimed in claim 10 wherein the filtering is performed according to the spacing of structures in the PBG element.

12. A method as claimed in claim 1 further comprising the step of:
k) generating the second optical signal with a light source.

13. A method as claimed in claim 12 wherein the light source comprises a laser.

14. A method as claimed in claim 1 further comprising the step of:
k) focusing the second optical signal at an input to the second pathway of the PBG element.

15. A method as claimed in claim 14 wherein the focusing is performed by a lens.

16. A method as claimed in claim 1 comprising the step of:
k) filtering the second optical signal with the PBG element.

17. A method as claimed in claim 16 wherein the filtering is performed according to the spacing of structures in the PBG element.

18. An optical device receiving a first optical signal and a second optical signal, the optical device comprising:
an integrated photonic transistor having a guiding element formed of periodic structures having a spacing related to the wavelength of the first optical signal and the second optical signal propagating therein, the guiding element further defining first and second pathways along which travel the first optical signal and the second optical signal, respectively, the first and second pathways joining to form an interference area in which the first and second optical signals interfere to form an optical interference signal;

a first phase modulator positioned in the first pathway of the guiding element and generating the phase-modulated first optical signal based on a first modulation signal;

a second phase modulator positioned in the second pathway of the guiding element and generating the phase-modulated second optical signal based on a second modulation signal; and a nonlinear element positioned to receive the optical interference signal and nonlinearly discriminating the optical interference signal to form the optical output signal having a digital logic state, the guiding element defining an output pathway adapted to receive and guide the discriminated optical output signal from the nonlinear element to an output of the device;

the nonlinear element optically positioned between an output of the interference area and an input to the output pathway; and the first and second pathways, the interference area and the output pathway defined by an absence of periodic structures in the guiding element.

19. An optical device as claimed in claim 18 wherein the integrated photonic transistor is formed on a substrate.

20. An optical device as claimed in claim 19 wherein the substrate is composed of silicon.

21. An optical device as claimed in claim 18 wherein the periodic structures are formed from a substrate by processing thereof.

22. An optical device as claimed in claim 21 wherein the processing comprises selective etching of material on the substrate.

23. An optical device as claimed in claim 21 wherein the processing comprises selective deposition of material on the substrate.

24. An optical device as claimed in claim 18 wherein the periodic structures are spaced by the wavelength of the first and second optical signals divided by the index of refraction of the material defining the structures.

25. An optical device as claimed in claim 18 wherein adjacent periodic structures are spaced by $0.44 \pm 0.04$ microns.

26. An optical device as claimed in claim 18 wherein the periodic structures are cylindrical in shape.

27. An optical device as claimed in claim 18 wherein the periodic structures are spherical in shape.

28. An optical device as claimed in claim 18 wherein the periodic structures are rod-like in shape.

29. An optical device as claimed in claim 18 wherein the nonlinear element comprises a grating.

30. An optical device as claimed in claim 18 wherein the nonlinear element comprises a multiple quantum dot array.

31. An optical device as claimed in claim 18 wherein the nonlinear element comprises a laser.

32. An optical device as claimed in claim 31 wherein the laser generates the optical output signal at $1.55 \pm 0.02$ microns.

33. An optical device as claimed in claim 18 wherein the nonlinear element comprises a cavity.

34. An optical device as claimed in claim 18 wherein the nonlinear element comprises a non-resonant amplifier.

35. An optical device as claimed in claim 18 wherein the effective length of the nonlinear element and the output pathway at least in part define the phase of the optical output signal at an output of the optical device.

36. An optical device as claimed in claim 18 further comprising:
a power supply coupled to provide electric power to the nonlinear element.

37. An optical device as claimed in claim 36 wherein the power supply is integrated on a substrate together with the nonlinear element and the guiding element.

38. An optical device as claimed in claim 18 wherein the first modulation signal is electric and the first phase-modulator comprises a piezoelectric element capable of changing the effective path length traveled by the first optical signal to phase-modulate the first optical signal.

39. An optical device as claimed in claim 18 wherein the first modulation signal is optic and the first phase-modulator comprises an optical phase modulation element capable of changing its refractive index in response to an optical modulation signal to phase-modulate the first optical signal.

40. An optical device as claimed in claim 18 wherein the first and second phase modulators are integrated together with the guiding element and nonlinear element on a substrate.

41. An optical device as claimed in claim 18 wherein the second modulation signal is electric and the second phase-modulator comprises a piezoelectric element capable of changing the effective path length traveled by the second optical signal to phase-modulate the second optical signal.

42. An optical device as claimed in claim 18 wherein the second modulation signal is optic and the second phase-modulator comprises an optical phase modulation element capable of changing its refractive index in response to the second optical modulation signal to phase-modulate the second optical signal.

43. An optical device as claimed in claim 18 further comprising:
a filter formed of spaced structures positioned in the first pathway.

44. An optical device as claimed in claim 43 wherein the filter is integrated on a substrate along with the guiding element.

45. An optical device as claimed in claim 18 further comprising:
a filter formed of spaced structures positioned in the second pathway.

46. An optical device as claimed in claim 45 wherein the filter is integrated on a substrate along with the guiding element.

47. An optical device as claimed in claim 18 further comprising:
a light source generating the first optical signal, and positioned to provide the first optical signal to the first pathway of the guiding element of the optical device.

48. An optical device as claimed in claim 47 wherein the light source is integrated on a substrate along with the guiding element.

49. An optical device as claimed in claim 47 wherein the light source is coherent.

50. An optical device as claimed in claim 47 wherein the light source comprises a solid-state laser.

51. An optical device as claimed in claim 47 wherein the first optical signal generated by the light source has a wavelength of 1.55±0.02 microns.

52. An optical device as claimed in claim 18 further comprising:
an optical focusing element positioned to focus the first optical signal to an opening of the first pathway defined in the guiding element.

53. An optical device as claimed in claim 52 wherein the optical focusing element is integrated on a substrate along with the guiding element and nonlinear element.

54. An optical device as claimed in claim 52 wherein the optical focusing element comprises a convex optical lens.

55. An optical device as claimed in claim 18 further comprising:
an optical focusing element positioned to focus the second optical signal to an opening of a second pathway defined in the guiding element.

56. An optical device as claimed in claim 55 wherein the optical focusing element is integrated on a substrate along with the guiding element and nonlinear element.

57. An optical device as claimed in claim 55 wherein the optical focusing element comprises a convex optical lens.

58. An optical device as claimed in claim 18 further comprising:
an optical focusing element positioned to focus the optical output signal to an opening of an output element receiving the optical output signal.

59. An optical device as claimed in claim 58 wherein the optical focusing element is integrated on a substrate along with the guiding element.

60. An optical device as claimed in claim 58 wherein the optical focusing element comprises a convex optical lens.

61. An optical device as claimed in claim 18 wherein the optical interference signal is amplitude-modulated based on the phase modulation of at least the first optical signal.

62. A optical device as claimed in claim 18 wherein the optical interference signal is amplitude-modulated based on the phase modulation of the second optical signal.

63. A optical device as claimed in claim 18 wherein the optical interference signal is phase-modulated based on the phase modulation of at least the first optical signal.

64. A optical device as claimed in claim 18 wherein the optical interference signal is phase-modulated based on the phase modulation of the second optical signal.

65. An optical device as claimed in claim 18 wherein the guiding element comprises a photonic bandgap (PBG) element.

66. An optical circuit comprising:
a logic stage comprising at least one optical logic gate integrated on a substrate, the optical logic gate receiving at least one phase-modulated optical input signal and a reference signal, the optical logic gate comprising input pathways guiding the phase-modulated optical input signal and reference signal to an interference area to generate a first interference signal nonlinearly discriminated by a nonlinear element to generate a phase-modulated optical output signal based on the phase-modulated optical input signal and the reference signal, the optical logic gate further comprising an output pathway to guide the phase-modulated optical output signal to an output of the logic stage, the input pathways, interference area and output pathway of the optical logic gate defined in a photonic bandgap (PBG) element, the nonlinear element comprising at least one of a laser, a cavity or a non-resonant amplifier; and
an output stage comprising a phase-to-amplitude converter coupled to receive the phase-modulated optical output signal, the phase-to-amplitude converter comprising input pathways guiding the phase-modulated optical output signal and the reference signal to an interference area to generate a second interference signal nonlinearly discriminated by a nonlinear element to generate an amplitude-modulated optical output signal based on the phase-modulated optical input signal and the reference signal, the output stage further comprising an output pathway to guide the amplitude-modulated optical output signal to an output of the logic stage, the input pathways, interference area and output pathway of the output stage defined in the photonic bandgap (PBG) element, the nonlinear element comprising at least one of a laser, a cavity or a non-resonant amplifier.

67. An optical circuit as claimed in claim 66 wherein the optical logic gate comprises an inverter.

68. An optical circuit as claimed in claim 66 wherein the logic stage comprises a NAND gate.

69. An optical circuit as claimed in claim 66 wherein the logic stage comprises at least one inverter and at least one NAND gate.

70. An optical circuit as claimed in claim 66 wherein the logic stage comprises at least one phase-shift element.

71. An optical circuit as claimed in claim 70 wherein the phase-shift element inverts the phase of the optical output signal.

72. An optical circuit as claimed in claim 66 wherein the first and second pathways, the interference area, the nonlinear element, and the output pathway comprise a photonic transistor.

73. An optical circuit as claimed in claim 66 wherein the PBG element comprises optical pathways connecting the optical logic gates, at least one of which turns at an angle of at least $\pi/3$ radians.

74. An optical circuit as claimed in claim 66 wherein the logic stage and output stage are integrated together on a substrate.

75. A method comprising the steps of:
a) receiving at least one phase-modulated optical input signal at a first pathway defined in the PBG element, the PBG element defined by periodic structures, the first pathway defined by an absence of structures in the PBG element;
b) receiving an optical reference signal at a second pathway defined in the PBG element, the second pathway defined by an absence of structures in the PBG element;
c) performing a phase logic operation based on the phase-modulated optical input signal and the optical reference signal with a nonlinear element situated in the PBG element and optically positioned between an output of the interference area and an input to an output pathway defined in the PBG element to produce a phase-modulated optical output signal, the output pathway defined by an absence of structures in the PBG element, the nonlinear element comprising one or more of a laser, a cavity or a non-resonant amplifier; and
d) outputting the phase-modulated optical output signal via an output pathway defined in the PBG element, the output pathway defined by an absence of structures in the PBG element.

76. A method as claimed in claim 75 wherein the steps (a)-(d) are performed by a logic stage of an optical circuit, the logic stage comprising at least one optical logic gate.

77. A method as claimed in claim 75 wherein the optical logic gate comprises one or more NAND gates and one or more inverter gates.

78. A method as claimed in claim 75 further comprising the steps of:
e) receiving the phase-modulated optical output signal;
f) converting the phase-modulated optical output signal into an amplitude-modulated optical output signal; and
g) outputting the amplitude-modulated optical output signal.

79. A method as claimed in claim 78 wherein the steps (e)-(g) are performed by an output stage of the optical circuit.

80. A method as claimed in claim 79 wherein the output stage comprises a phase-to-amplitude modulation converter.

* * * * *